United States Patent [19]
Carney et al.

[11] Patent Number: 5,535,240
[45] Date of Patent: Jul. 9, 1996

[54] TRANSCEIVER APPARATUS EMPLOYING WIDEBAND FFT CHANNELIZER AND INVERSE FFT COMBINER FOR MULTICHANNEL COMMUNICATION NETWORK

[75] Inventors: Ronald R. Carney, Palm Bay; Terry L. Williams, Melbourne Beach, both of Fla.

[73] Assignee: AirNet Communications Corporation, Melbourne, Fla.

[21] Appl. No.: 146,364

[22] Filed: Oct. 29, 1993

[51] Int. Cl.$^6$ .............................. H04B 1/38; H04L 5/16
[52] U.S. Cl. ...................... 375/219; 375/260; 375/232; 375/229; 370/70
[58] Field of Search ................................. 375/11–14, 7, 375/37, 38; 370/18, 23, 29, 58.1, 123, 70, 97

[56] References Cited

U.S. PATENT DOCUMENTS

| | | | |
|---|---|---|---|
| 4,199,660 | 4/1980 | Dill et al. | 370/50 |
| 4,312,062 | 1/1982 | Bellanger et al. | 370/50 |
| 4,316,282 | 2/1982 | Macina . | |
| 4,393,456 | 7/1983 | Marshall, Jr. | 364/724 |
| 4,510,598 | 4/1985 | Gockler et al. | 370/50 |
| 4,623,980 | 11/1986 | Vary | 364/724 |
| 4,754,449 | 6/1988 | Crookshanks | 370/70 |
| 4,785,447 | 11/1988 | Ichiyoshi | 370/70 |
| 4,792,943 | 12/1988 | Gockler | 370/70 |
| 4,881,191 | 11/1989 | Morton . | |
| 4,933,954 | 6/1990 | Petry | 375/1 |
| 5,289,464 | 2/1994 | Wang . | |
| 5,299,192 | 3/1994 | Guo et al. | 370/70 |
| 5,323,391 | 6/1994 | Harrison . | |

FOREIGN PATENT DOCUMENTS

| | | |
|---|---|---|
| 0501690 | 2/1992 | European Pat. Off. . |
| 0549451 | 12/1992 | European Pat. Off. . |
| 9410772 | 5/1994 | WIPO . |

OTHER PUBLICATIONS

"Multirate Digital Signal Processing" by Ronald E. Crochiere and Lawrence R. Rabiner; Prentice–Hall, Inc., Englewood Cliffs, NJ; pp. 296–317.

"A Weighted Overlap–Add Method of Short–Time Fourier Analysis/Synthesis" by R. E. Crochiere; *IEEE Transactions on Acoustics, Speech, and Signal Processing;* vol. ASSP–28, No. 1, Feb., 1980; pp. 99–102.

(List continued on next page.)

*Primary Examiner*—Stephen Chin
*Assistant Examiner*—Don Vo
*Attorney, Agent, or Firm*—Cesari and McKenna

[57] ABSTRACT

A physically compact, multichannel wireless communication transceiver architecture employs overlap and add or polyphase signal processing functionality, previously applied to narrowband speech analysis research, for wideband signal processing. A receiver section receives a plurality of multiple frequency communication channels and outputs digital signals representative of the contents of the plurality of multiple frequency communication channels. The receiver section contains an FFT-based channelizer that processes the digital signals output by a wideband digital receiver and couples respective channel outputs to a first plurality of digital signal processor units, which process (e.g. demodulate) respective ones of the digital channel signals and supply processed ones of the digital channel signals at respective output ports for distribution to an attendant voice/data network. On the transmit side, a transmit section contains a plurality of digital signal processors, respectively associated with respective ones of a plurality of incoming (voice/data) communication signals to be transmitted over respectively different frequency channels. Their processed (modulated, encoded) outputs are supplied to an inverse FFT combiner. The FFT combiner supplies a combined multichannel signal to a wideband transmitter which transmits a multiple frequency communication channel signal. Each of the channelizer and combiner may be implemented using overlap and add or polyphase filtering.

72 Claims, 25 Drawing Sheets

OTHER PUBLICATIONS

"Time–Frequency Representation of Digital Signals and Systems Based on Short–Time Fourier Analysis" by Michael R. Portnoff; *IEEE Transactions on Acoustics, Speech, and Signal Processing,* vol. ASSP–28, No. 1, Feb., 1980; pp. 55–69.

"Short Term Spectral Analysis, Synthesis, and Modification by Discrete Fourier Transform" by Jont B. Allen; *IEEE Transactions on Acoustics, Speech and Signal Processing;* vol. ASSP–25, No. 3 Jun., 1977; pp. 235–237.

"A Unified Approach to Short–Time Fourier Analysis and Synthesis" by Jont B. Allen and Lawrence R. Rabiner; *Proceedings of the IEEE,* vol. 65, No. 11, Nov., 1977; pp. 1558–1564.

"FIR Digital Filter Banks for Speech Analysis" by R. W. Schafer, L. R. Rabiner and O. Herrmann; *The Bell Technical Journal;* vol. 54, No. 3, Mar. 1975; pp. 531–544.

"Design and Simulation of a Speech Analysis–Synthesis System Based on Short–Time Fourier Analysis" by Ronald W. Schafer and Lawrence R. Rabiner; *IEEE Transactions on Audio and Electroacoustics,* vol. AU21, No. 3, Jun., 1973, pp. 165–174.

Bonnerot, et al., "Digital Processing Techniques in the 60 Channel Transmultiplexer", IEEE Transactions on Communications vol. COM–26, May 1978, pp. 698–706.

Bellanger, et al., "TDM–FDM Transmultiplexer: Digitial Polyphase and FFT", IEEE Transactions on Communications, vol. COM–22, Sep. 1974, pp. 1199–1205.

Bakhru, "Multi–Channel Digital Sonobouy Receiver", in MILCOM 90: IEEE Military Communications Conference Record, (New York: Institute of Electrical and Electronic Engineers, 1990), vol. 3, pp. 1250–1255.

Chester, et al., "Implementation of a Wide Band, High Dynamic Range Digital Drop Receiver", IEEE Proceedings of ICASSP 91, May 14–17, 1991.

Olmstead et al., "A Digital Tuner for Wideband Receivers", DSP Applications Magazine, Sep., 1992.

IEE Colloquium on "Communications Simulation and Modelling Techniques", Sep. 28, 1993.

Fig. 4

| Fig. 4A | Fig. 4B |
| Fig. 4C | Fig. 4D |

Fig. 6

| Fig. 6A | Fig. 6B |
| Fig. 6C | Fig. 6D |

Fig. 7

| Fig. 7A | Fig. 7B |
| --- | --- |
| Fig. 7C | Fig. 7D |

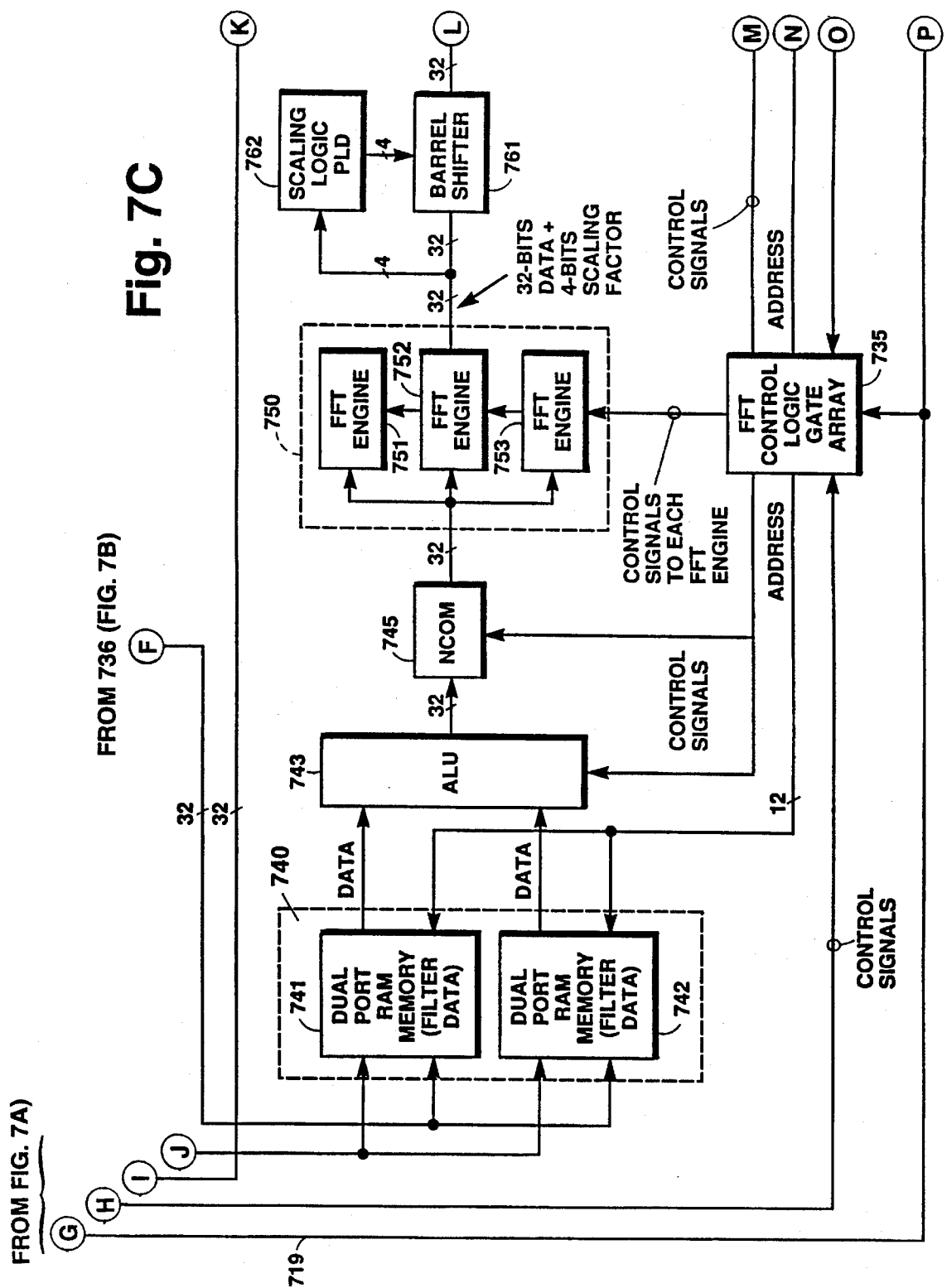

TRANSCEIVER APPARATUS EMPLOYING WIDEBAND FFT CHANNELIZER AND INVERSE FFT COMBINER FOR MULTICHANNEL COMMUNICATION NETWORK

FIELD OF THE INVENTION

The present invention relates in general to wireless (e.g. cellular and personal communication systems (PCS)) communication networks and is particularly directed to a new and improved transceiver apparatus, a receiver section of which contains a wideband, Fast Fourier transform based (FFT) channelizer to extract multiple channels from a digitized intermediate frequency (IF) signal and a transmitter section of which contains a wideband inverse FFT based combiner to combine multiple digitized baseband channels into a single IF signal for transmission.

BACKGROUND OF THE INVENTION

In order to provide multi-channel voice/data communications over a broad geographical area, wireless (e.g. cellular) communication service providers currently install transceiver base-stations in protected and maintainable facilities (e.g. buildings). Because of the substantial amount of hardware currently employed to implement the signal processing equipment for a single cellular channel, each base-station is typically configured to provide multichannel communication capability for only a limited portion of the frequency spectrum that is available to the service provider. A typical base-station may contain three to five racks of equipment which house multiple sets of discrete receiver and transmitter signal processing components in order to service a prescribed portion (e.g. 48) of the total number (e.g. 400–30 KHz) channels within an available (e.g. 12 MHz) bandwidth.

The receiver section of a typical one of a basestation's plurality (e.g. 48) of narrowband (30 KHz) channel units is diagrammatically illustrated in FIG. 1 as comprising a dedicated set of signal processing components, including a front end, down-conversion section 10, an intermediate frequency (IF) section 20 and a baseband section 30. Front end section 10 is comprised of a low noise amplifier 11 to which the transceiver site's antenna is coupled, a radio frequency-to-intermediate frequency (RF-IF) down-converting mixer 13 and an associated IF local oscillator 15, while IF section 20 is comprised of a bandpass filter 21 to which the output of mixer 13 is coupled, an amplifier 23, an IF-baseband mixer 25 and an associated baseband local oscillator 27. Bandpass filter 21 may have a bandwidth of 100 KHz centered at a respective one of the 400–30 KHz sub-portions of a 10 MHz wide cellular voice/data communication band, diagrammatically illustrated in the multichannel spectral distribution plot of FIG. 2.

Baseband section 30 contains a lowpass (anti-aliasing) filter 31, an analog-to-digital (A-D) converter 33, a digital (demodulator/error correction) processing unit 35, and an associated telephony (e.g. T1 carrier) unit 37 through which the processed channel signals are coupled to attendant telephony system equipment. The sampling rate of the A-D converter 33 is typically on the order of 75 kilosamples/sec. The narrowband channel signal as digitized by A-D converter 33 is demodulated by processing unit 35 to recover the embedded voice/data signal for application to telephony carrier unit 37. (A similar dedicated signal processing transmitter section, complementary to the receiver section, is coupled to receive a digital feed from the telephony system equipment and output an up-converted RF signal to the transceiver site's antenna.)

For a typical urban service area, in order to optimize service coverage within the entire bandwidth (e.g. 10–12 MHz) available to the service provider and to ensure non-interfering coverage among dispersed transceiver sites at which the base-stations are located, the transceiver sites are customarily geographically distributed in mutually contiguous hex-cells (arranged in a seven cell set). Thus, each cell has its own limited capacity multi-rack basestation that serves a respectively different subset of the available (400) channels, whereby, over a broad geographical area, the frequency allocation within respective cells and the separation between adjacent cell sets may be prescribed to effectively prevent mutual interference among any of the channels of the network.

It will be readily appreciated that, since every channel has components spread over multiple equipment racks, such as those that make up a typical channel receiver section described above with reference to FIG. 1, the cost and labor in geographically situating, installing and maintaining such equipment are not insubstantial. Indeed, the service provider would prefer to employ equipment that would be more flexible both in terms of where it can be located and the extent of available bandwidth coverage that a respective transceiver site can provide. This is particularly true in non-urban areas, where desired cellular coverage may be concentrated along a highway, for which the limited capacity of a conventional 48 channel transceiver site would be inadequate, and where a relatively large, secure and protective structure for the multiple racks of equipment required is not necessarily readily available.

SUMMARY OF THE INVENTION

In accordance with the present invention, the limited channel capacity and substantial hardware requirements associated with signal processing architectures currently employed by multichannel wireless communication service providers, described above, are effectively obviated by a new and improved, relatively compact multichannel transceiver apparatus that makes it possible to significantly reduce the size and hardware complexity of a wireless (voice/data) communication network transceiver site, so that the transcevier may be readily physically accommodated at a variety of installation sites, such as above the drop ceiling in an office building or on an electric utility pole, while having the capability of providing multichannel communication service (e.g. greater than one hundred channels) that spans the entire channel capacity offered by the service provider, rather than only a subset of the available channels.

For this purpose, the transceiver apparatus of the present invention contains a receiver section having a wideband discrete Fourier transform (DFT) channelizer for processing multiple channels of digitized received signals, and a transmitter section which contains a wideband inverse DFT combiner for processing multiple digitized transmit channel signals. Pursuant to the embodiment of the DFT channelizer and DFT combiner, the discrete Fourier transform may be implemented as, but is not restricted to, a Fast Fourier transform (FFT), whereas the fast Fourier transform is an efficient algorithm for computing the discrete Fourier transform when the size of the transform is a power of two.

The multichannel receiver unit is operative to receive a plurality of multiple frequency communication channels and output digital signals representative of the contents of the plurality of multiple frequency communication channels. A DFT-based channelizer unit is coupled to receive the digital signals output by the multichannel receiver unit and outputs respective digital channel signals representative of the contents of respective ones of the communication channels received by the multichannel receiver unit. The respective digital channel outputs are supplied to a first plurality of digital signal processor units, respectively associated with digital channel signals output by the channelizer unit, which process (e.g. demodulate) respective ones of the digital channel signals and supply processed ones of the digital channel signals at respective output ports for distribution to an attendant voice/data network.

On the transmit side, the transceiver includes a second plurality of digital signal processor units, respectively associated with respective ones of a plurality of incoming (voice/data) communication signals to be transmitted over respectively different frequency channels, and being operative to process respective ones of the plurality of incoming communication signals and to supply processed ones of the communication channel signals at respective output ports for application of an inverse DFT processing combiner. The inverse discrete Fourier transform-based combiner unit is coupled to receive communication channel signals processed by the second plurality of digital signal processor units and outputs a combined signal representative of the contents of the communication channel signals processed by the second plurality of digital signal processor units. A multichannel transmitter unit is operative to transmit a multiple frequency communication channel signal in accordance with the combined signal output by the discrete Fourier transform-based combiner unit.

In accordance with the invention the filter structures employed in the transmit and receive paths are implemented as overlap and add filter units or as polyphase filter units. Pursuant to a first embodiment of the invention, the wideband channelizer employs an overlap and add filter structure, to which digitized data samples output by a high speed A-D converter in the wideband receiver are applied. As received data samples are fed to an input rate buffer, the data is monitored by an amplitude monitor unit for the purpose of providing gain control for the input signals and ensuring full utilization of the dynamic range of the A-D converter. (For this purpose, the output of the amplitude monitor unit is fed back to the wideband receiver to control an attenuator that is upstream of the A-D converter.)

When the rate buffer contains a 'block' of M samples, it signals a control unit to begin processing a 'block' of M samples of data. A 'block' of M samples of data is equal to the decimation rate of the channelizer, which is given by the nearest integer of the input sample rate divided by two times the complex channel sample rate. When the input sample rate is large (on the order of 30 MHz), a half band filter may be employed to reduce the clock rate of the data. The half band filter performs a real-to-complex conversion of the data and also decimates the data and clock rate by two. The clock reduction is necessary to implement the filtering structure with present day integrated circuits. If the input clock rate were signifcantly lower or, as the processing capability of future technologies increases, the half band filter may not be necessary. The M samples are clocked out of the rate buffer into to a half band filter in bursts at a rate higher than the input sample clock rate, in order to accommodate the size of the FFT processor, which requires N samples, where N>M, which implies that the overlap and add filter must operate at a clock rate faster than one-half the input sample rate.

The complex data values from the half band filter are clocked to a shift register employed within an overlap and add filter. The overlap and add filter is a real valued low pass filter with a cutoff frequency of one-half of the channel bandwidth. The basic architecture of an overlap and add filter is similar to that of a finite impulse response (FIR) filter. However, the filter of the invention differs from a conventional FIR filter by the use of feedback multiplexers and long delay line elements between filter taps.

More particularly, the filter's shift register is preferably implemented by cascading sets of delay memory units with interleaved 'feedback' multiplexers. A respective tap stage of the filter is formed of a pair of serially coupled memory sections, a feedback multiplexer, a coefficient memory and a coefficient multiplier. Each coefficient memory stores a respective set of filter coefficients, the number of which corresponds to the size of the FFT processor.

In an exemplary embodiment of the channelizer filter structure, four filter tap stages may be employed. The outputs of the multipliers of the respective tap stages are summed together. Within a memory section, the length of an input memory stage is equal to the decimation rate M; the length of an output memory stage represents the filter 'overlap' is equal to N-M, where N is the size of the FFT processor.

In order to process each block of M input samples, N clock signals are required to supply the FFT processor with a sufficient number of data samples for FFT processing. During the first M of the N clock signals, M samples are clocked through a rate buffer and a half band filter and through the filter's memory stages that effectively for a shift register. During this time frame, data is shifted from left to right through each of the memory sections of the shift register. For the remaining N-M ones of the N data samples, data is not clocked out of the rate buffer memory and there is not shifting of data through the input memories of each tap stage. Namely, data is not shifted through the shift register, as only the output memories are clocked. This clocking of the output memories is the mechanism used to effect the intended overlap and add operation.

As respective sets of coefficient-weighted data samples generated by the filter's tap stages are summed, they produce an N sample aliased convolved output data sequence, which is stored in a RAM in preparation for application to an FFT processor. In order to maintain throughput for high processing rates, the FFT processor contains a plurality of FFT engines that have been programmed with the proper FFT size associated with the signal processing parameters of interest. Implementing the FFT processor with plural engines maintains data throughput as the processing time for a single engine is typically longer than the time required to collect N samples required for processing.

In accordance with a practical embodiment, the FFT engines may employ a radix-4 (block floating point) algorithm having FFT sizes that are a power of four. For a 512 point FFT processor, production of all 512 frequency bins is carried out by using two 256-point FFTs that are preceded by a decimation-in-frequency radix-2 butterfly. For a 512-point FFT, The samples are read out of the RAM and supplied to an arithmetic logic unit (ALU), which sums successive pairs of even data samples and subtracts successive pairs of odd data samples. For even data sample processing, the ALU's output sum value is supplied directly to FFT processor engines. For generating odd bins of a 512-point FFT, as odd bin data samples are read out of the RAM, the difference between data samples provided by the ALU is multiplied by $W_N^n$ by a numerically controlled oscillator, modulator and clocked into the FFT processor.

Since the FFT engines employ a block floating point algorithm (outputting a four bit scaling factor with the complex FFT data), a scaling logic circuit is used to control a barrel shift circuit, to which the output of the FFT engine is coupled. The barrel shift circuit adjusts the data as it is read out from the FFT engines in accordance with the scaling factor, so as to ensure that consecutive FFTs are aligned to the same scale. The output of barrel shift circuit is coupled to an output RAM.

The output of the FFT processor must be multiplied by a complex exponential $W_N^{-kmM}$, where M is the decimation rate, k is the FFT bin number, and m is the FFT (block) number. To execute an equivalent operation, the overlap and add channelizer uses the identity $x[(n-r)_N]=FFT(W_N^{-rk}*K[k])$, where x[n] is the FFT input sequence, and $x[(n-r)_N]$ is the circular shift of x[n] by r modulo N, and causes the dual port output RAM to be addressed in a manner that accesses processed data values in an order that effects a circular shifting of the FFT's input data sequence.

When FFT-processed data for each channel (frequency bin) has been written into the output RAM, an attendant time division multiplexed (TDM) bus interface circuit asserts the data onto a TDM bus, so that it may be applied to digital signal processors on the bus, which are operative to demodulate and extract voice or data from the channel data. Data on the TDM bus is preferably divided into a plurality of time slots. The bus connected processors are synchronized to the TDM bus by a conventional framing signal, so that the processors will know the correct time slot from which to read data.

The signal processing architecture of a multichannel combiner, which is complementary to the wideband channelizer having the overlap and add filter structure described above, employs a custom TDM bus for collecting data for a large number of channels at relatively high data rates, since the aggregate data rate from all channels typically exceeds the bus bandwidth of standard bus protocols, (e.g. VMEbus).

The sources of the channelized (voice/data) signals that are asserted onto the TDM bus are DSP processors that format (e.g. to a cellular standard) and modulate incoming voice or data signals from an attendant telephone network, thereby providing a baseband analytic signal. Each data source is assigned one or more time slots during which it will transfer a single complex sample when requested by the combiner. No two sources can be allocated the same time slot. Time slots are assigned by a system controller (a separate central processing unit (CPU) on a VME bus) during system initialization. The system controller also programs the combiner to specify all times slots that contain valid data.

A sample from each DSP processor is requested via control signals applied to the TDM bus from a TDM bus controller and associated buffer/drivers. This sample is written into an input (RAM) buffer. The TDM bus controller synchronizes the addressing of the RAM buffer to framing signals of the TDM bus, thereby insuring that each channel is written to the proper address in the dual port RAM. When the combiner has collected data from all operative channels, the TDM bus controller couples control signals to an FFT control logic unit, causing the FFT control logic unit to initiate FFT processing.

Complementary to the forward FFT processor functionality of the overlap and add channelizer, the overlap and add combiner causes an inverse FFT to be performed. In terms of a practical implementation, generation of an inverse FFT is effected using a forward FFT. The FFT processor is configured to have a size equal to the next 'power of two' greater than the number of channels to be combined. To maintain throughput, the FFT processor contains a plurality of FFT engines that have been programmed with the proper FFT size associated with the signal processing parameters of interest. Implementing the FFT processor with plural engines maintains data throughput as the processing time for a single engine is typically longer than the time required to collect N samples required for processing.

Zeros are written sequentially into an FFT engine for a prescribed (relatively limited) number of frequency bins. For a subsequent plurality of bins, data may be read from an input dual port RAM for the active channels. If the channel is not an active channel, the control logic unit writes a zero into that bin. The identities of those channels that are active are programmed into control logic unit during system initialization. For the remaining (relatively limited) number of bins, zeros are written into those bins.

In order to generate an inverse FFT using a forward FFT, the following identity is used: $x[n]=K*FFT(X[((-k))_K])$, where x[n] is the inverse FFT of X[k], n=sample number, k=FFT bin, K=FFT size, and $X[((-k))_K]$ reversing the order of the sequence, X[k], by modulo K. By generating a mirror of the input data to the FFT about bin 0, the forward FFT becomes an inverse FFT scaled by the FFT size. The FFT control logic unit addresses the input RAM in a reverse order when writing data into the FFT engines.

As in the overlap and add channelizer, order to generate a 512-point FFT in the combiner architecture, the FFT engines employ a radix-4 (block floating point) algorithm having FFT sizes that are a power of four. Using a radix-2 decimation time butterfly, N/2-point FFTs are generated from even and odd samples of the 512-point input sequence. Multiplication of odd sample FFT data values is performed by a numerically controlled oscillator, modulator (NCOM). To process the first 256 bins of a 512-point FFT, the output of a first half of the dual port RAM is summed with the output of a second half of the RAM by means of an ALU. For the second 256 bins, the output of the two RAM halves are subtracted from each other. To accommodate the propagation delay through the NCOM and ensure that the proper pair of samples are processed by the ALU, a set of delay registers are coupled in the output path from the RAM to the ALU.

The combiner algorithm requires that the input sequence of the inverse FFT be multiplied by a complex exponential, $W_K^{kmR}$, where k=input frequency bin, K=inverse FFT size, m=inverse FFT number, R is the combiner's interpolation rate, and $W_K=e^{-j*2*\pi/K}$. Using a mathematical identity, this multiplication operation can be effected by a circular rotation of the output samples of the inverse FFT, i.e.: $x[((n-r))_K]$=inverse FFT $(W^{-rk}*X[k])$, where r is equal to –mR. By rotating the inverse FFT output samples by –mR, the phase shift of the complex exponential is generated. This rotation is performed by the FFT output addressing logic.

Since the FFT engines generate FFTs using a block-floating point algorithm, which provides a scaling factor dependent upon the characteristics of the input data, barrel shifting circuits are coupled in the signal flow input paths to the ALU, in order to adjust the FFT data to the same scale to properly align the data for subsequent processing.

Like the channelizer, the overlap and add filter of the combiner comprises plural filter tap stages. The FFT size and the number of stages set the overall length of the filter. The filter is designed as a real low pass filter with a cutoff frequency equal to one half the channel bandwidth. A respective stage of the filter is formed of one or both of a pair of delay memory elements of a shift register, a feedback multiplexer, a coefficient memory, a multiplier and an internal adder. Each coefficient memory stores a respective set of N filter (weighting) coefficients, the number of which corresponds to the size of the FFT processor. The output of the FFT processor from the ALU is distributed to multipliers of all filter stages and multiplied by the coefficients of each stage simultaneously. The outputs of a tap stage multiplier is summed with data being accumulated and shifted through the delay memories in the tap stage adder for application to the next stage of the filter.

The first filter tap stage of the filter does not require an input delay memory section since zeros are shifted into the first filter stage. The length of each delay memory is determined by the filter interpolation rate, which is defined in accordance with the channel and output sample rates. The filter interpolation rate, R, is the nearest integer of the quotient: R=round (output sample rate/channel sample rate). The length of each of the output delay memory sections is R, while the length of each input delay memory section, also known as the filter overlap, is given by: overlap=(N–R). The interpolation rate R also specifies the required signal processing rate of the overlap and add filter. The minimum clock rate that the filter must process data to maintain throughput is given by: filter processing rate=output rate*N/R.

For every N samples output by the inverse FFT processor, the overlap and add filter outputs R samples. For the first R samples of each inverse FFT, a first input port through the multiplexers is selected. During this time, all data is clocked and summation values produced by an adder in the last stage of the filter are input to a half band filter. For the remaining N-R samples, a second port of each multiplexer is selected, and the outputs of the internal adders of the respective stage are fed back to their delay memory sections. During this time input memory sections are not shifted and the data from the adder in the last stage is not clocked into the half band filter. Again, as in the overlap and add filter of the channelizer, the feedback of the last N-R samples provides the filter overlap.

The half band filter is configured as an integrated circuit that provides complex to real data conversion, which doubles the output sample rate. Although the entirety of the combiner could be implemented as a completely real system, this would require all sample rates, processing rates and FFT sizes to be doubled, increasing complexity and cost. A rate buffer is coupled to the output of half band filter to allow a continuous flow of data from the combiner. Data stored in the rate buffer is coupled via an output driver unit to an output data link for application to a D-A converter of the transmit side of the transceiver site. A half full flag from the rate buffer is supplied over a control signal line to a control logic circuit, to indicate to the TDM bus interface unit when to request data. When the quantity of data stored in the rate buffer falls to less than half its capacity, the flag becomes inactive, which signals the TDM bus interface to request channel data from its active channels to maintain a continuous flow of output data.

As in the overlap and channelizer architecture, respective oscillators are provided for each output sample rate required. A further set of logic circuits is included to generate additional clock signals employed by the combiner. The clock output of a high rate oscillator is divided down by counters to generate the necessary filter processing clock, TDM bus clock, and FFT engine system clock.

A second embodiment of the wideband channelizer of the present invention is configured as a polyphase filter structure. As in the overlap and add channelizer embodiment, the architecture of an FFT-based polyphase filter bank analysis (channelizer) system accepts real-time wide band IF (intermediate frequency) signals and performs frequency translation and channelization to a number of individual narrow baseband analytic signals. The polyphase filter channelizer provides full programmable control of the system parameters via a standard VMEbus interface (as defined by the Institute of Electrical and Electronics Engineers (IEEE) standard Std 1014-1987) and channelized data distribution over a custom, time division multiplexed (TDM) data bus.

In the polyphase channelizer architecture, the input sample rate is an integral multiple of the channel sample rate, which implies that the channel sample rate must be a multiple of the channel bandwidth. Channelized data is distributed by the channelizer as analytic baseband signals. The channelizer's input interfaces to the digital data output link from an A-D converter of an upstream wide band digital receiver. The input sample clock rate is determined by the number of channels being received and the bandwidth of those channels. As in the overlap and add embodiment, an amplitude monitoring logic circuit monitors the input data, in order to provide automatic gain control of the input signal, and insure that the full dynamic range of the A-D converter in the receiver is being utilized.

Input samples are clocked into a half band filter that performs a real-to-complex conversion of the input data. The half band filter also decimates the data by two, reducing the clock rate of the data by half. The complex data samples are then fed into a shift register of a polyphase filter, specifically, clocked into a delay memory that forms a portion of a shift register within a first filter stage. The length of each delay memory is equal to the FFT size in the channelizer. The output of each delay memory is applied to coefficient multipliers which operate at a rate that is I times the clock rate of shift register, where I is an oversampling factor of two. This implies that each sample at the output of the delay memories is multiplied to two (I=2) filter coefficients, prior to being clocked into the next delay memory.

In an exemplary embodiment of the polyphase filter architecture, four filter stages are employed. The FFT size, oversampling factor, and the number of stages establish the overall length of the filter. N filter coefficients are stored in coefficient RAMs of each filter tap stage. The filter coefficients are decimated by the number of taps (e.g. four) when loading coefficient RAMs. The outputs of respective coefficient, data multipliers are summed and written into a dual port RAM, in preparation for application to the polyphase channelizer's FFT processor.

The FFT processor of the polyphase channelizer has effectively the same configuration and operates in substantially the same manner as the FFT processor of the overlap and add channelizer described above. Once FFT-processed data for each channel (frequency bin) has been written into an output RAM, an FFT control logic unit signals an attendant TDM bus interface circuit to assert the data onto a TDM bus, so that it may be applied to attendant digital signal processors on the bus, which are operative to demodulate and extract voice or data from the channel data. The polyphase channelizer may also be configured to write one or more channels of data into a test memory, which allows a CPU on the VMEbus to collect and analyze channel data without interfacing to custom TDM bus.

The signal processing architecture of the polyphase combiner, which is complementary to the wideband channelizer having the polyphase filter structure described above, also allows real-time processing of multiple digital voice or data signals, and performs frequency translation and signal combining to an IF (intermediate frequency) output sample rate, again providing fully programmable control of the system parameters via a VMEbus interface and channelized data collection over a custom, time division multiplexed (TDM) data bus.

The front end (FFT processor) of the polyphase combiner is the same as that of the overlap and add architecture described above, but employs a different filter structure, in which adders are not internally cascaded with respective delay memories as in the overlap and add combiner filter. Instead the polyphase combiner filter structure corresponds to that employed in the polyphase channelizer. The output of the polyphase filter is coupled to a half band filter, which provides complex to real data conversion, which doubles the output sample rate. The output of the half band filter to an output data link for application to D-A converter of the transmit side of the transceiver site.

DETAILED DESCRIPTION

Figure 1:
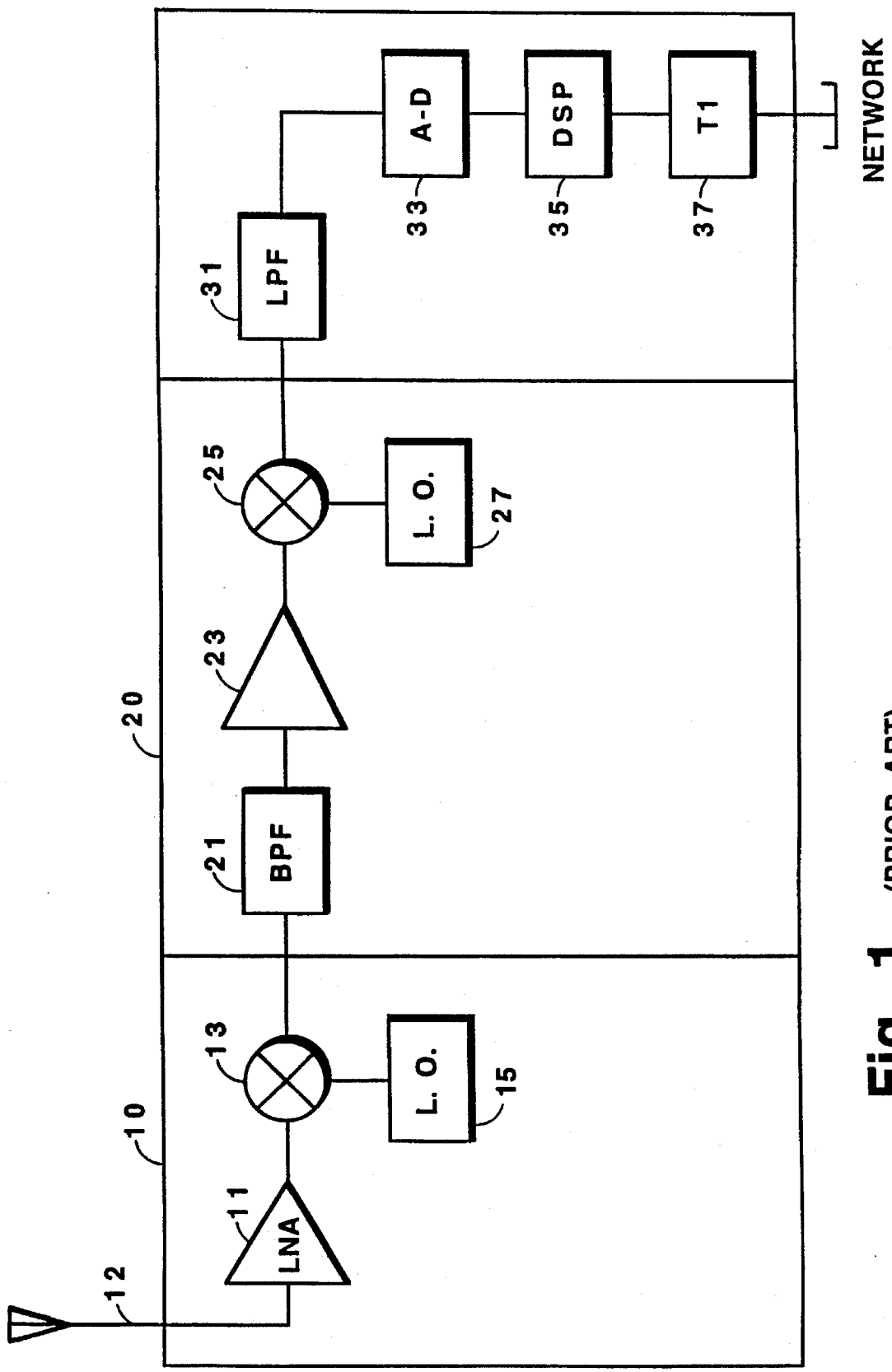
FIG. 1 diagrammatically illustrates the receiver section of a conventional cellular communication base-station channel unit.
Figure 2:
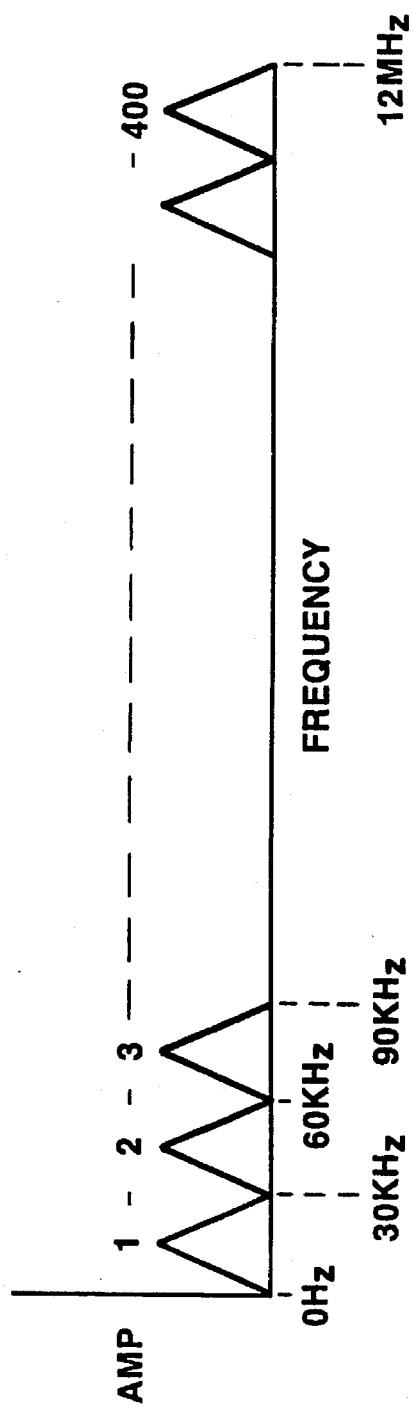
FIG. 2 is a multi-channel spectral distribution plot of 400–30 KHz sub-portions of a 12 MHz wide voice/data communication band.

Before describing in detail the particular improved wideband multichannel transceiver apparatus in accordance with the present invention, it should be observed that the present invention resides primarily in a novel structural combination of commercially available communication and signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 3:
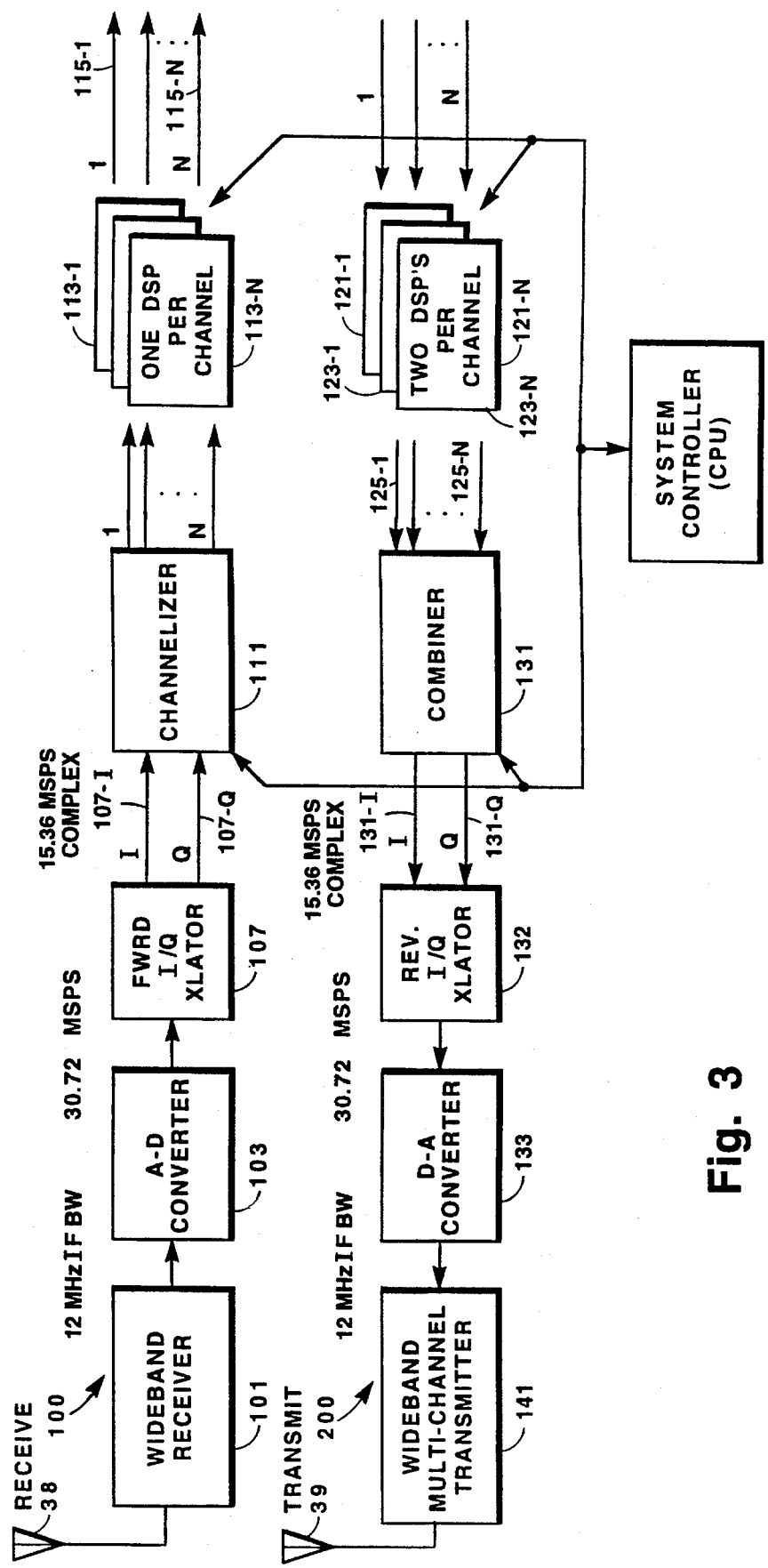
FIG. 3 diagrammatically illustrates a wideband multichannel transceiver apparatus in accordance with the present invention.
Figure 4A:
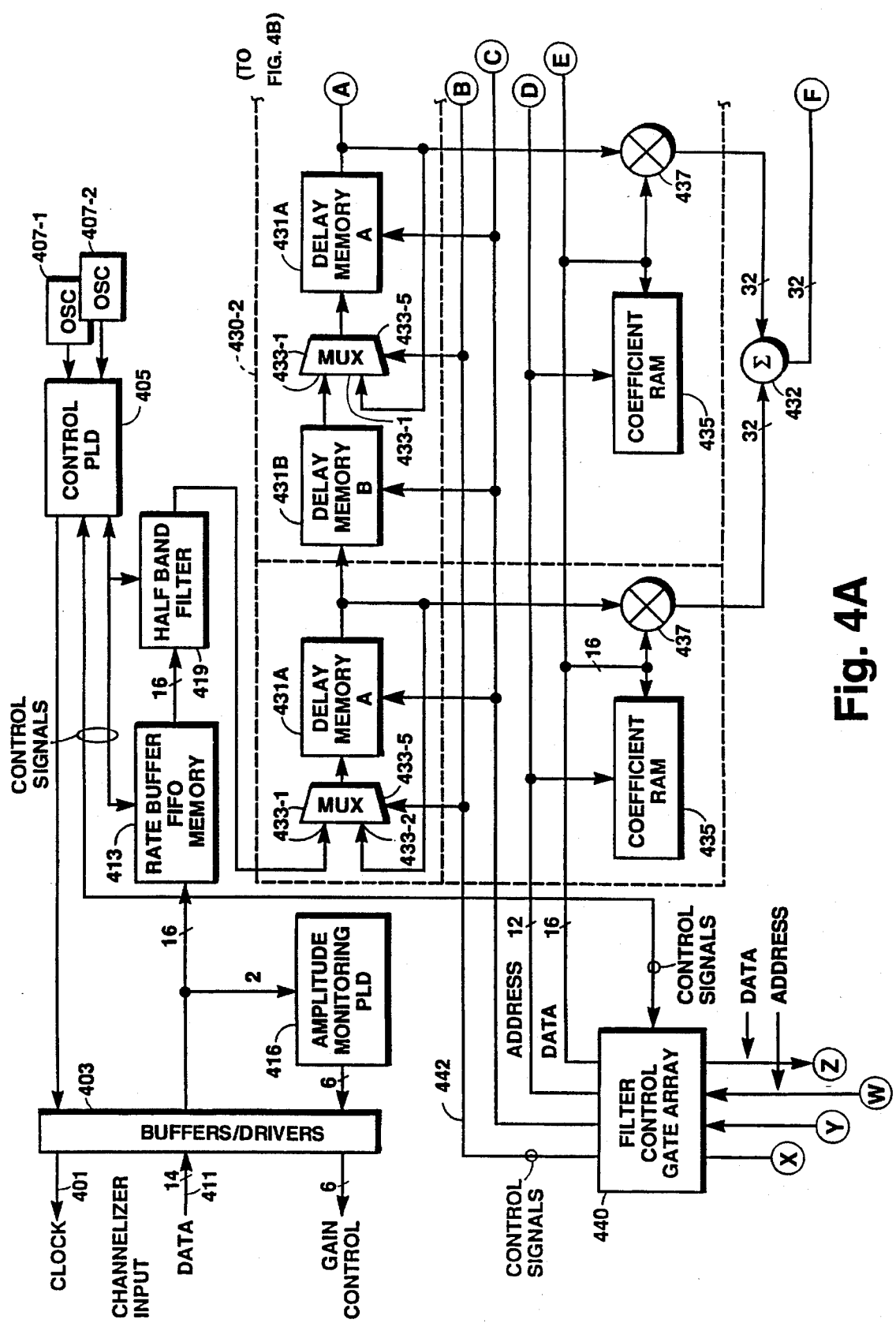
FIG. 4 diagrammatically illustrates the configuration of an overlap and add channelizer that may be employed in the transceiver apparatus of FIG. 3 in accordance with a first embodiment of the present invention.
Figure 4B:
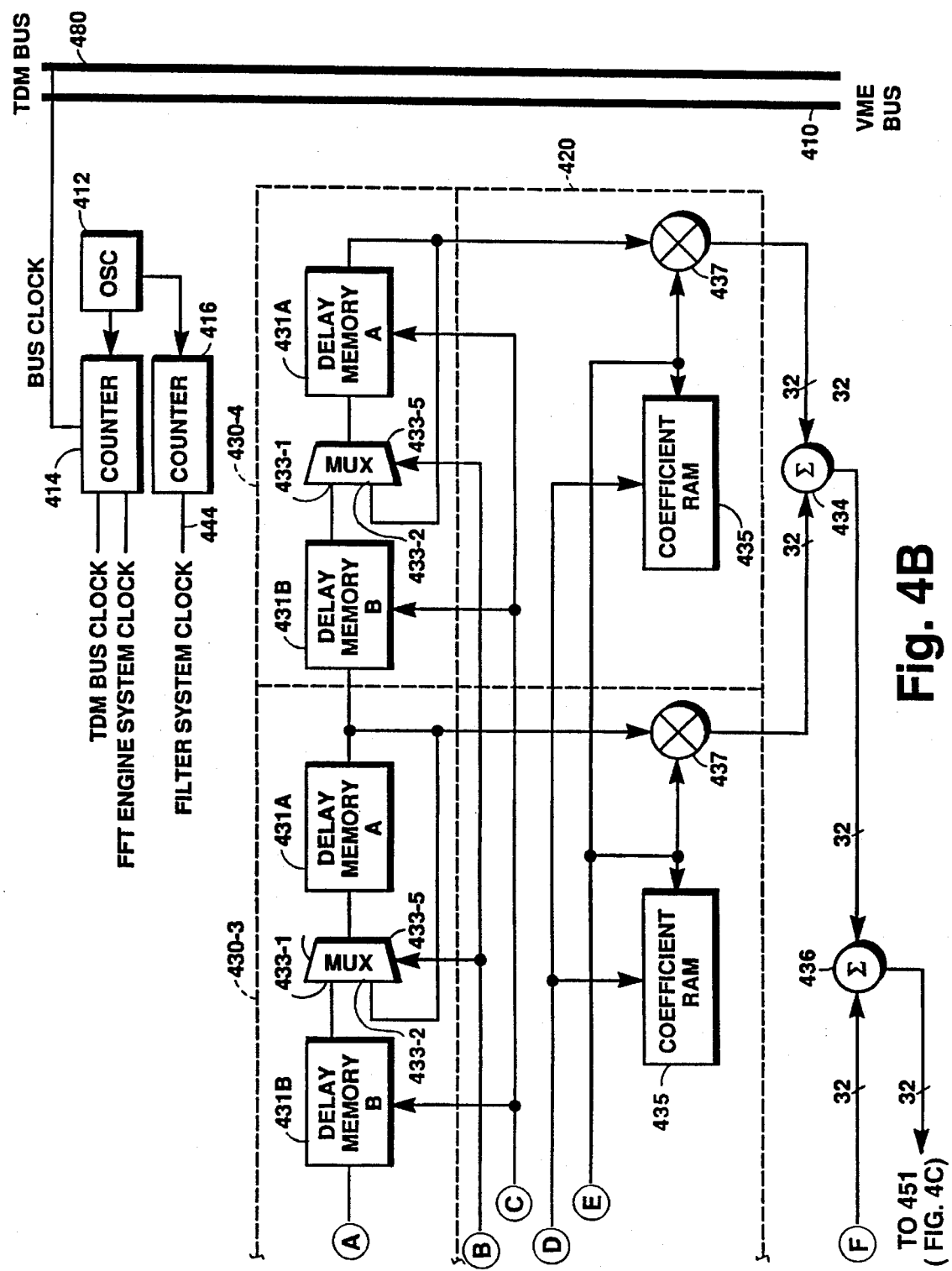
Figure 4C:
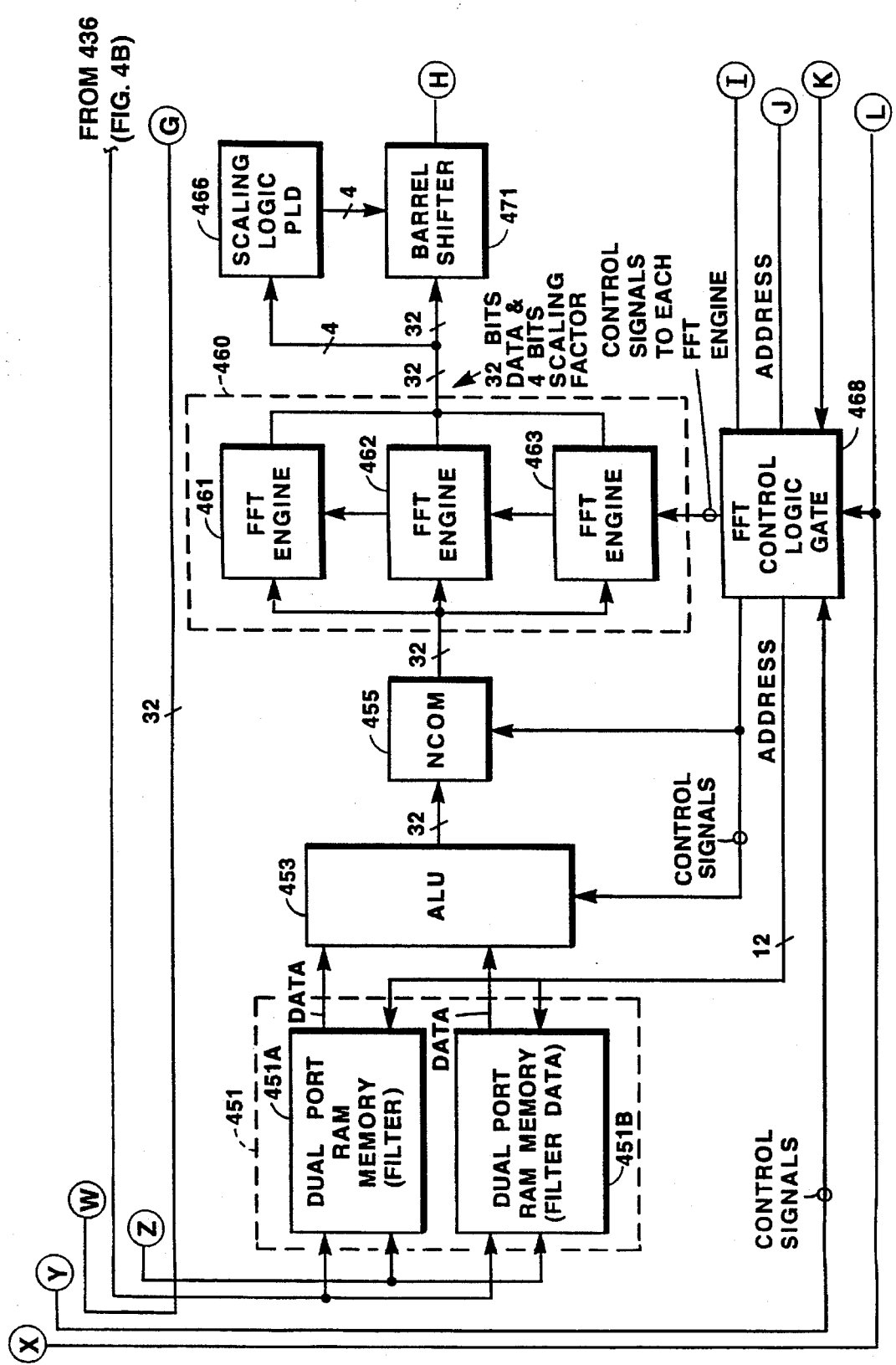
Figure 4D:
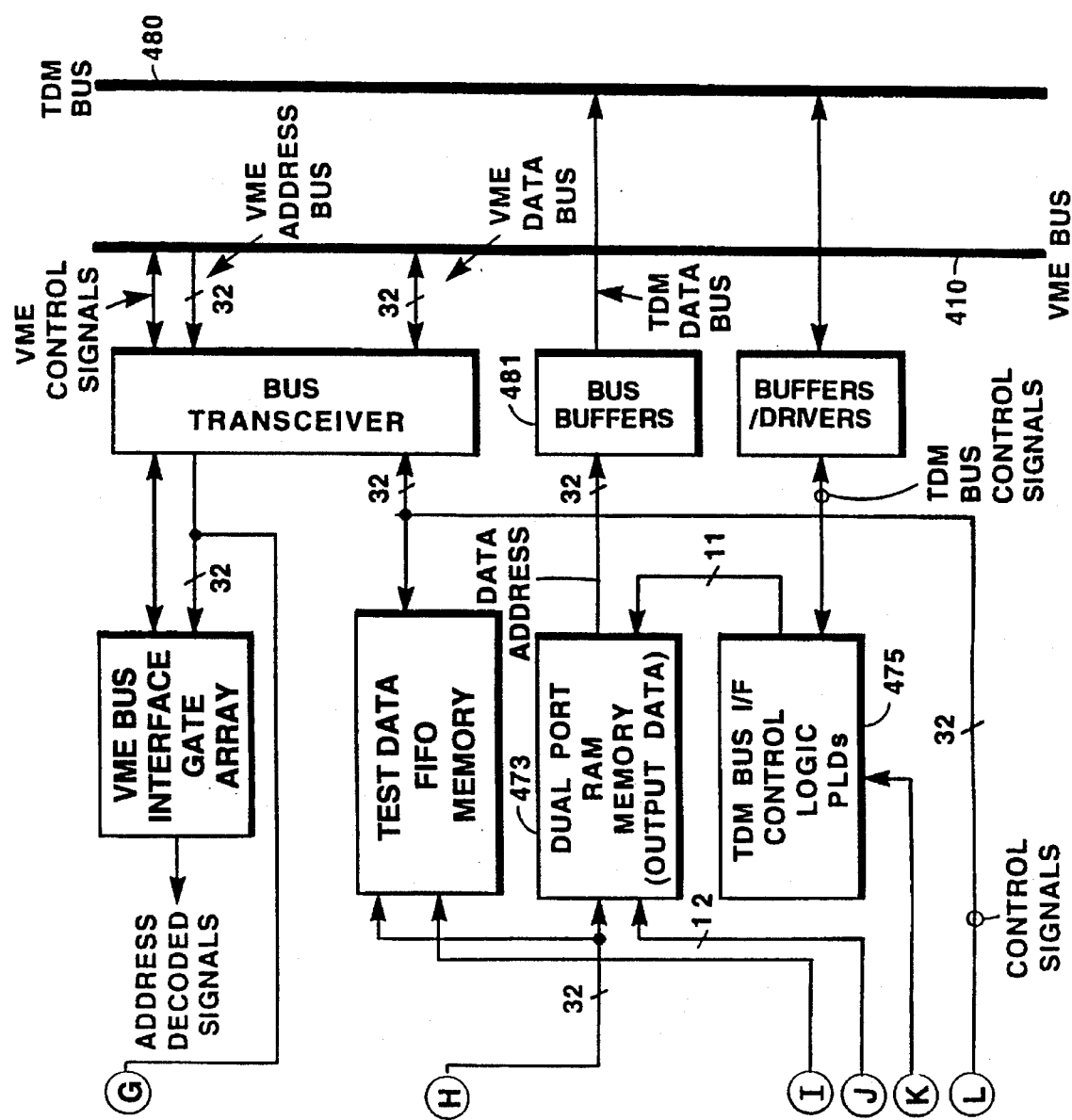

Referring now to FIG. 3, the transceiver apparatus of the present invention is diagrammatically illustrated as comprising a receiver section 100 and a transmitter section 200. Receiver section 100 is coupled to an antenna 38 to a wideband receiver 101 capable of receiving any of channels offered by a communications service provider. As a non-limitative example, wideband receiver 101 may comprise a WJ-9104 receiver, manufactured by Watkins-Johnson Company, 700 Quince Orchard Road, Gaithersburg Md. 20878-1794.

The spectrum of interest may be that described previously—e.g. a 10–12 MHz band comprised of 400–30 KHz channels. It should be observed however, that the present invention is not limited to use with this or any other set of communication system parameters. The values given here are merely for purposes of providing an illustrative example. Also, while the term 'wideband' is not limited to any particular spectral range, it is to be understood to imply a spectral coverage of at least the entirety of the useful range of the communication range over which the system may operate (e.g. 10–12 MHz). Narrowband, on the other hand, implies only a portion of the spectrum, for example, the width of an individual channel (e.g. 30 KHz).

The output of wideband receiver 101 is a down-converted, multi-channel (baseband) signal containing the contents of all of the (30 KHz) voice/data channels currently operative in the communication system or network of interest. This multichannel baseband signal is coupled to a high speed A-D converter 103, such as a Model AD9032 A-D converter manufactured by Analog Devices, One Technology Way, Norwood, Mass. 02062-9106. Advantageously, the dynamic range and sampling rate capabilities of currently commercially available A-D converters, such as that referenced above, are sufficiently high (e.g. the sampling rate may be on the order of 25 megasamples/sec.) to enable downstream digital signal processing (DSP) components, including a digital Discrete Fourier transform (DFT) channelizer 111, to be described below with reference to FIGS. 4–8, to process signals within any of the (400–30 KHz) channels of the system and output such signals onto respective channel links to the carrier interface (e.g. T1 carrier digital interface) of the telephony network.

Fast Fourier transform (FFT) channelizer 111 is operative to process the output of A-D converter 103, which is coupled thereto by way of a digital in-phase/quadrature (I/Q) translator 107. I/Q translator 107 outputs respective I and Q channel (i.e. complex) digitally formatted signals over I and Q links 107I and 107Q, respectively. FFT channelizer extracts, from the composite digitized multichannel (I/Q) signal, respective narrowband channel signals representative of the contents of respective ones of the (30 KHz) communication channels received by wideband receiver 101. The respective channel signals are coupled via N output links (e.g. N=400 in the present example) to respective digital receiver processing units 113-1 . . . 113-N, each of which is operative to demodulate and perform any associated error correction processing embedded in the modulated signal, just as in the conventional transceiver unit of FIG. 1. For this purpose, each of digital receiver processing units 113 may comprise a Texas Instruments TMS320C50 digital signal processor, manufactured by Texas Instruments (Post Office Box 655303, Dallas, Tex. 75265). The demodulated signals derived by digital receiver processing units 113 are coupled over respective channel links 115-1 . . . 115-N to a telephony carrier interface (e.g. T1 carrier digital interface) of an attendant telephony network (not shown).

Transmitter section 200 includes a second plurality of digital signal processing units, specifically transmitter signal processing units 121-1 . . . 121-N, that are coupled to receive respective ones of a plurality of channel digital voice/data communication signals to be transmitted over respectively different narrowband (30 KHz) frequency channels of the multichannel network. Like digital receiver processing units 113 in receiver section 100, a respective digital transmitter processing unit 121 may comprise a model TMS320C50 digital signal processor manufactured by Texas Instruments. Transmitter signal processing units 121 are operative to modulate and perform pretransmission error correction processing on respective ones of the plurality of incoming communication signals and to supply processed ones of the narrowband communication channel signals at respective output ports 123-1 . . . 123-N.

From output ports 123-1 . . . 123-N of the transmitter signal processing units 121, the modulated narrowband channel signals are coupled over channel links 125-1 . . . 125-N to respective input ports of an inverse FFT-based multichannel combiner unit 131, to be described below, which outputs a combined signal representative of the contents of a wideband signal which is a composite of the respective narrowband communication channel signals processed by digital transmitter signal processing units 121. The output of multichannel combiner unit 131 is coupled to an I/Q translator unit 132. I/Q translator receives respective in-phase and quadrature signal components from combiner 131 on links 131I and 131Q and provides a combined output signal to a digital-to-analog (D-A) converter 133. Digital-to-analog (D-A) converter 133, like high speed A-D converter 103 in receiver section 100, preferably comprises a currently commercially available unit, such as a model AD9712A D-A converter manufactured by Analog Devices. The output of D-A converter 133 is coupled to a wideband (multichannel) transmitter unit 141, which is operative to transmit a wideband (multichannel) communication channel signal containing the composite signal output by inverse fast Fourier transform-based combiner unit 131. The output of transmitter unit 141 is coupled to an antenna 39 for transmission.

One of the features of the present invention that reduces the amount of hardware required to provide broad coverage for an increased (full spectrum) capacity cellular transceiver site is the application of convolutional—decimation spectral analysis techniques to each of a wideband multichannel signal extraction architecture (channelizer 111) and a wideband multichannel signal combining architecture (combiner 131). Because all of the channels of the operational communication band available to the service provider can be processed using digital processing components which operate at very high data rates that accommodate the substantial bandwidth of present day wireless communication systems, it is no longer necessary to either construct a separate narrowband signal processing unit for each channel, nor is it necessary to limit the number of channels per site to less than the full capacity of the network.

More particularly, the present invention makes it possible to significantly reduce the size and hardware complexity of a wireless communication network transceiver site by the use of either overlap and add or polyphase channelizer and combiner architectures, the fundamental signal processing functionalities of which are mathematically detailed in Chapter 7 of the text "Multirate Digital Signal Processing," by R. E. Crochiere et al, published by Prentice-Hall, Inc. Since the algorithms for each of these two types of filter transform functions are rigorously set forth in the Crochiere text, they will not be repeated here. For a more detailed description of overlap and add and polyphase signal processing, per se, involved, attention may be directed to the Crochiere text, per se. The description to follow will detail practical embodiments of both overlap and add, and polyphase, implementations of each the channelizer and combiner employed in the inventive transceiver apparatus, for real-time wide band wireless IF signal processing, which performs frequency translation and channelization of to plurality of individual narrow baseband signals.

OVERLAP AND ADD CHANNELIZER (FIG. 4)

The channelizer implementation of FIG. 4 provides full programmable control of the system parameters by way of a standard VMEbus interface, and channelized data distribution over a custom, time division multiplexed (TDM) data bus. For purposes of providing a non-limiting illustrative example, both a 400 channel, 30 kHz system (which may be employed in a North American Digital Cellular (NADC), as defined by the Electronics Industries Association and Telecommunications Industry Association standard TIA/EIA IS-54) cellular system) and a fifty channel, 200 kHz system (which may be employed with the Pan-European Groupe Speciale Mobile (GSM) cellular standard) will be described, in order to facilitate an appreciation of the relationship between system parameters (channel bandwidth, number of channels, sampling and processing rates, etc.) and the control parameters of the channelizer itself. For the 400 channel, 30 kHz channel system, a sample rate of 50 kHz is assumed. For the 200 kHz system, a 300 kHz sample rate is assumed. Channelized data is output by the channelizer as analytic baseband signals, and the channel sample rates will depend upon the channelizer's filter design, as will be described.

As pointed out above, the raw data upon which the channelizer is to operate is derived from wideband receiver 101 (FIG. 3). The sampling rate of the receiver's associated A-D converter (103) is controlled by a sample rate clock signal supplied over link 401 from a buffer/driver interface 403 under the control of a control unit 405. Control unit 405 preferably is comprised of a set of combinational logic and flip-flops that are driven by associated clock sources 407, so as to implement a state machine sequence control function to be described. The input sampling clock rate is determined by the number of channels being received and the bandwidth of the received channels.

Clock signals for the filter system, FFT processor and output TDM bus, to be described, are derived from a high rate (e.g. 200 MHz) reference oscillator 412 and associated down counters 414 and 416.

Since the channelizer 111 is FFT-based, the total number of channels must be a power of two. Due to characteristics of the anti-aliasing filter contained in the wideband receiver, channels that are near to the edges of the band are typically not useful. In order to process 400 30 kHz channels, the size of the FFT channelizer must be a 512 point processor. To process 50 200 kHz channels, a 64 point FFT processor is required.

The total input bandwidth that is to be sampled is N times the channel bandwidth, where N is the size of the FFT processor. The channelizer algorithm requires an input sampling rate equal to 2*N*channel bandwidth, which is the sample rate equal to the minimum rate required by the Nyquist sampling theorem.

Thus, for a 30 kHz channelizer, the minimum clock rate is 25.62 MHz, while the filter minimum clock rate for the 200 kHz channelizer is 19.05 MHz. In the present example, in order to accommodate each of these sampling rates, clock unit 407 may contain respectively dedicated oscillators 407-1 and 407-2, as shown. (Which oscillator is employed may be determined during initialization by a system controller (a CPU (not shown) attached to a system VMEbus 410)).

For 30 kHz channels, a 512 point FFT channelizer covers a bandwidth of 15.36 MHz, while 400 30 kHz channels cover 12 MHz. The receiver must center the 400 30 kHz channels in the center of the 15.36 MHz band, thereby providing 56 channels or 1.68 MHz of guard bands on both ends of the band to allow for aliasing. Similarly, for 200 kHz channels, a 64 point FFT channelizer covers a bandwidth of 12.8 MHz. Centering 50 channels provides 7 channels or 1.4 MHz guard band spacing on both ends of the band to allow for aliasing.

The digitized data samples output by the receiver's high speed A-D converter are sequentially clocked over link 411 through buffer/driver interface 403 and loaded into a rate buffer FIFO (first-in, first-out) memory 413, via control signals on bidirectional link 415 from controller 405. As the data is fed to rate buffer FIFO its two most significant bits are monitored by logic circuitry 416 which serves as an amplitude monitor unit for the purpose of providing gain control for the input signals and ensuring full utilization of the dynamic range of the A-D converter. The output of unit 416 is fed back to the wideband receiver to control an attenuator (not shown) that is upstream of the A-D converter.

When the FIFO rate buffer 413 contains a 'block' of M samples, it signals the control unit 405 to begin processing the block of data. These M samples are then clocked out of the FIFO 413 over link 417 to a half band filter 419 in bursts at a rate higher than the input sample clock rate in order to accommodate the size of the FFT processor, which requires N samples. As will be explained in detail below, N>M implies that the overlap and add filter must operate at a clock rate faster than one-half the input sample rate.

Half-band filter 419 performs real-to-complex conversion of the input data and also decimates the data by a factor of two, thereby dividing the clock rate in half. These complex data values are clocked over link 421 to a shift register 422 employed within an overlap and add filter 420. Filter 420 comprises two real low pass filters with a cutoff frequency of one-half of the channel bandwidth. The overall length of filter 420 is given by:

filter length=N*number of filter taps

Shift register 422 is preferably implemented by cascading sets of delay memory units 431 with interleaved 'feedback' multiplexers 433, as shown. A respective tap stage 430 of filter 420 is formed of memory elements 431A and 431B, a feedback multiplexer 433, a coefficient memory 435 and a multiplier 437. Each coefficient memory 435 stores a respective set of filter coefficients, the number of which corresponds to the size of the FFT processor. During initialization, the coefficients are downloaded to the coefficient memory by a system controller via the VMEbus 410.

In the illustrated embodiment, there are four tap stages 430-1 . . . 430-4. The outputs of multipliers 437 of the respective tap stages summed together via summation stages 432, 434, 436. Thus, as functionally illustrated in FIG. 5, shift register 422 may be considered to be formed of a set of (J=4) cascaded K-stage shift registers, or a single shift register J*K stages in length, to which the digital data sample outputs are supplied. The overall length (J*K) of shift register 422 is given by the desired (time domain) window length of a convolutional filter, so that the longer (greater the number of stages of) the register, the sharper the characteristic of the filter. For the 30 kHz channelizer of the present example, a 512-point FFT with a 50 kHz channel sample rate must be produced every 20 microseconds, while for a 200 kHz channelizer with a 300 kHz sample rate, a 64-point FFT must be generated every 3.333 microseconds. For the 200 kHz channelizer, which employs a 64 point FFT processor, filter 420 has an overall length of 256 stages.

Figure 5:
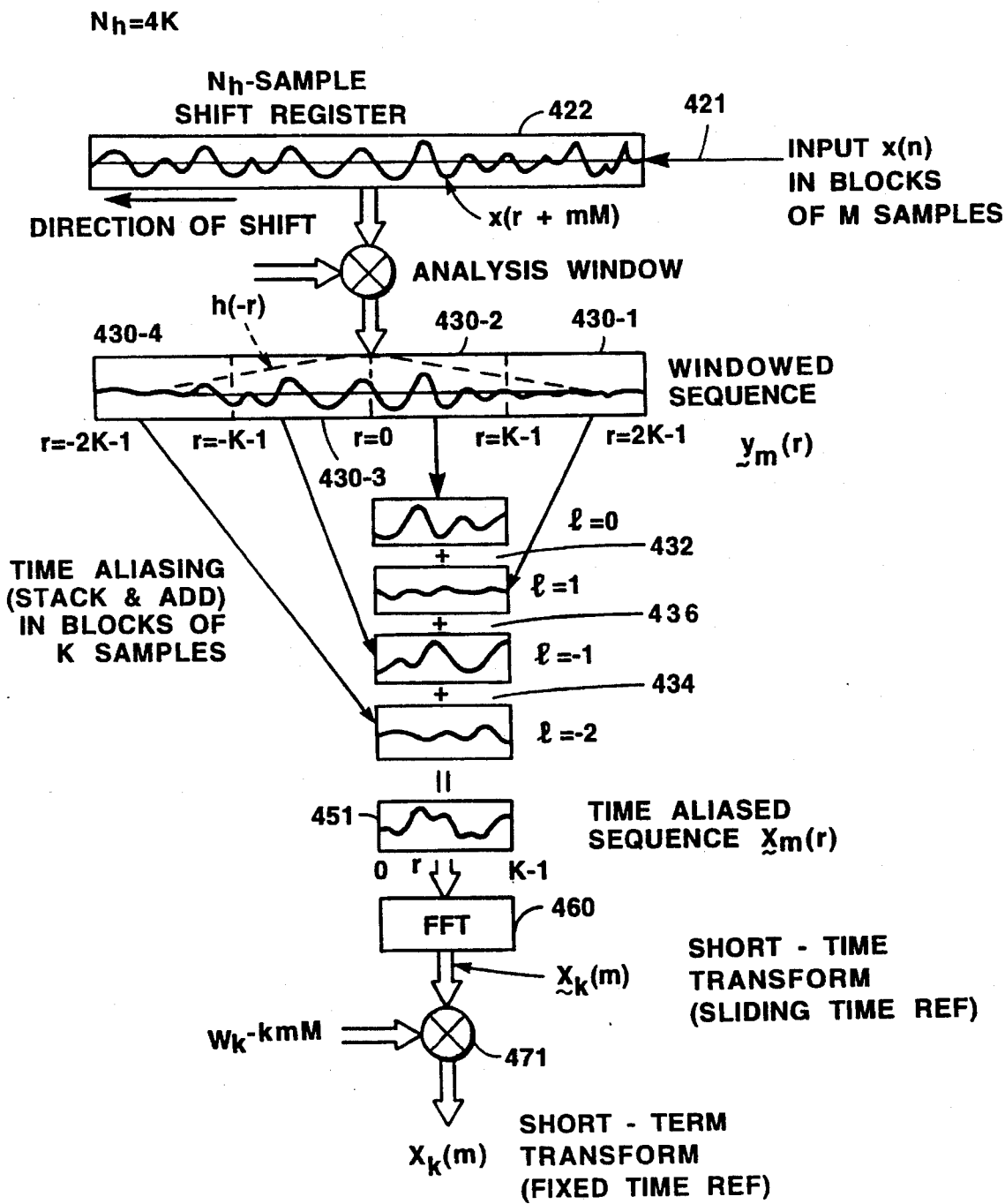
FIG. 5 is a functional diagram associated with the signal processing mechanism executed by the overlap and add channelizer of FIG. 4.
Figure 6A:
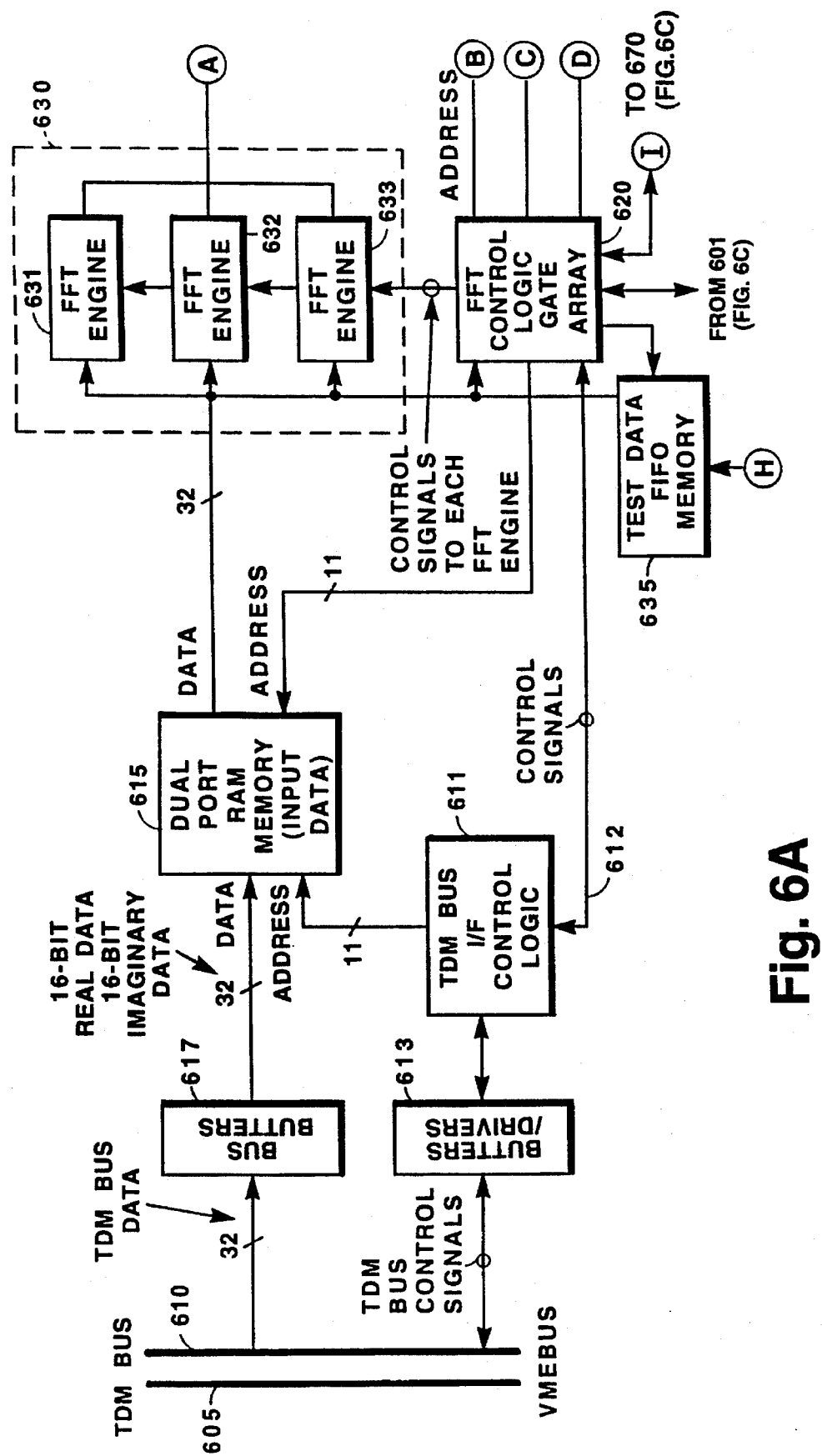
FIG. 6 diagrammatically illustrates the signal processing architecture of a multichannel overlap and add combiner, which is functionally complementary to the wideband channelizer having the overlap and add filter structure of FIG. 4.
Figure 6B:
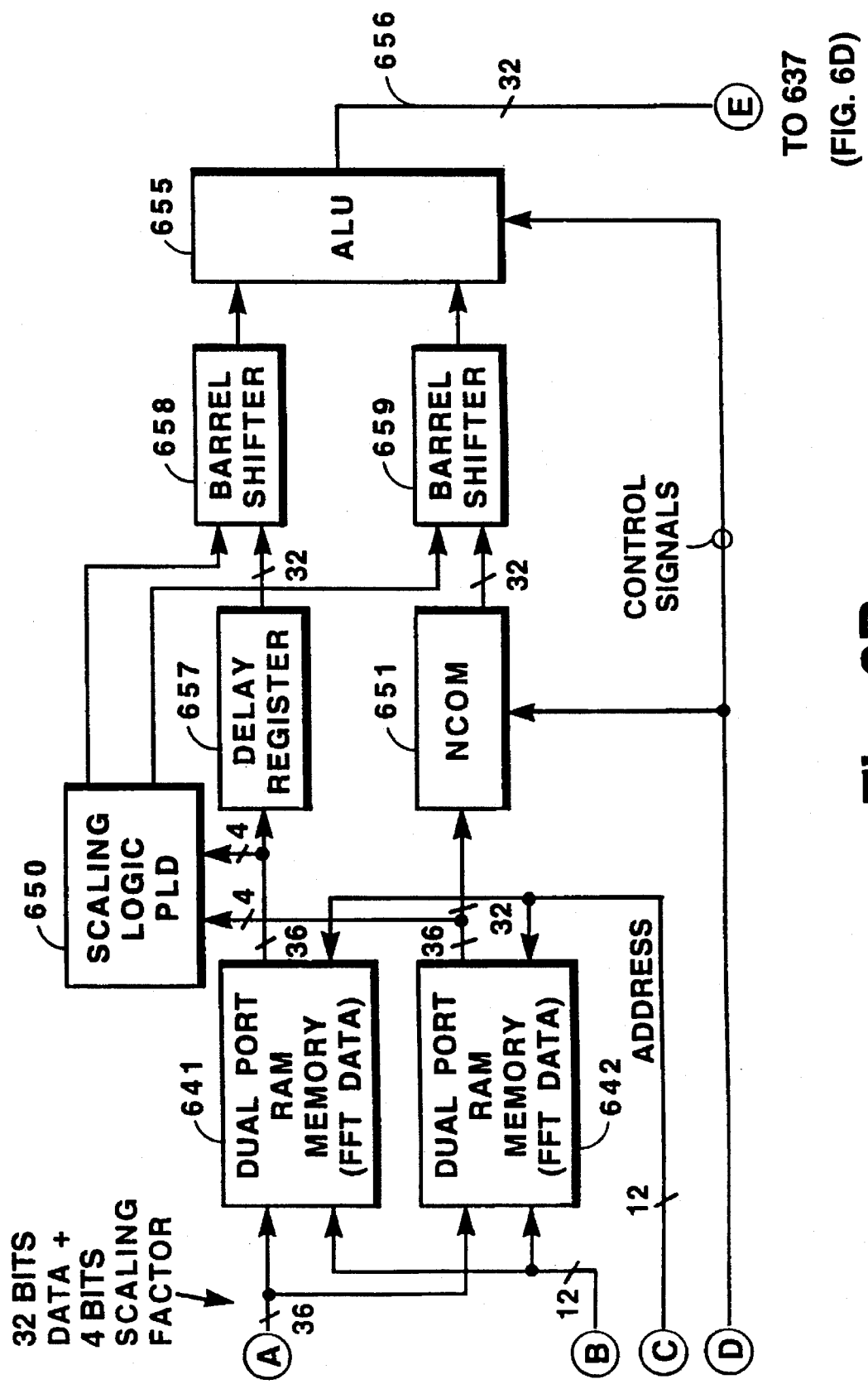
Figure 6C:
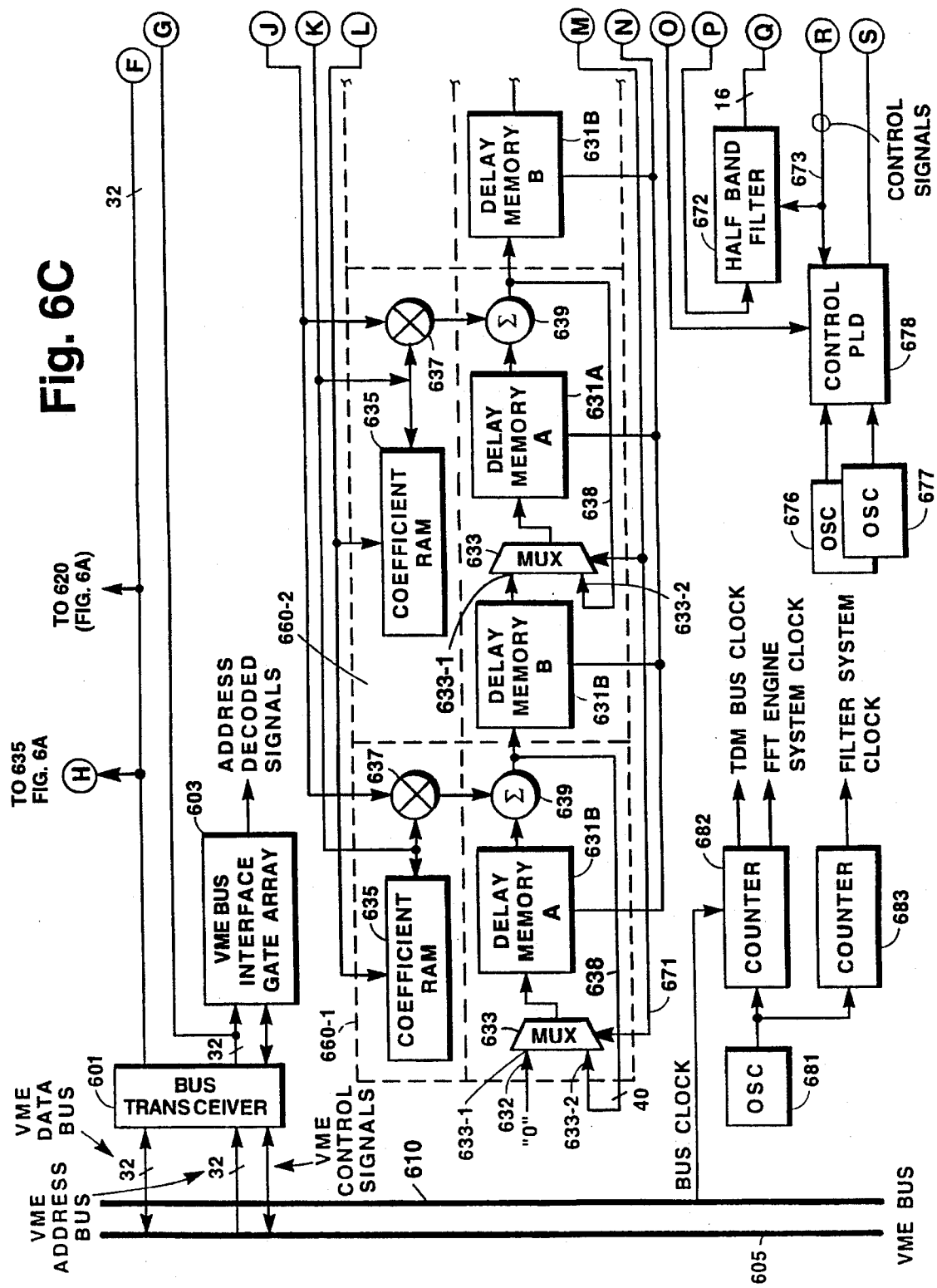
Figure 6D:
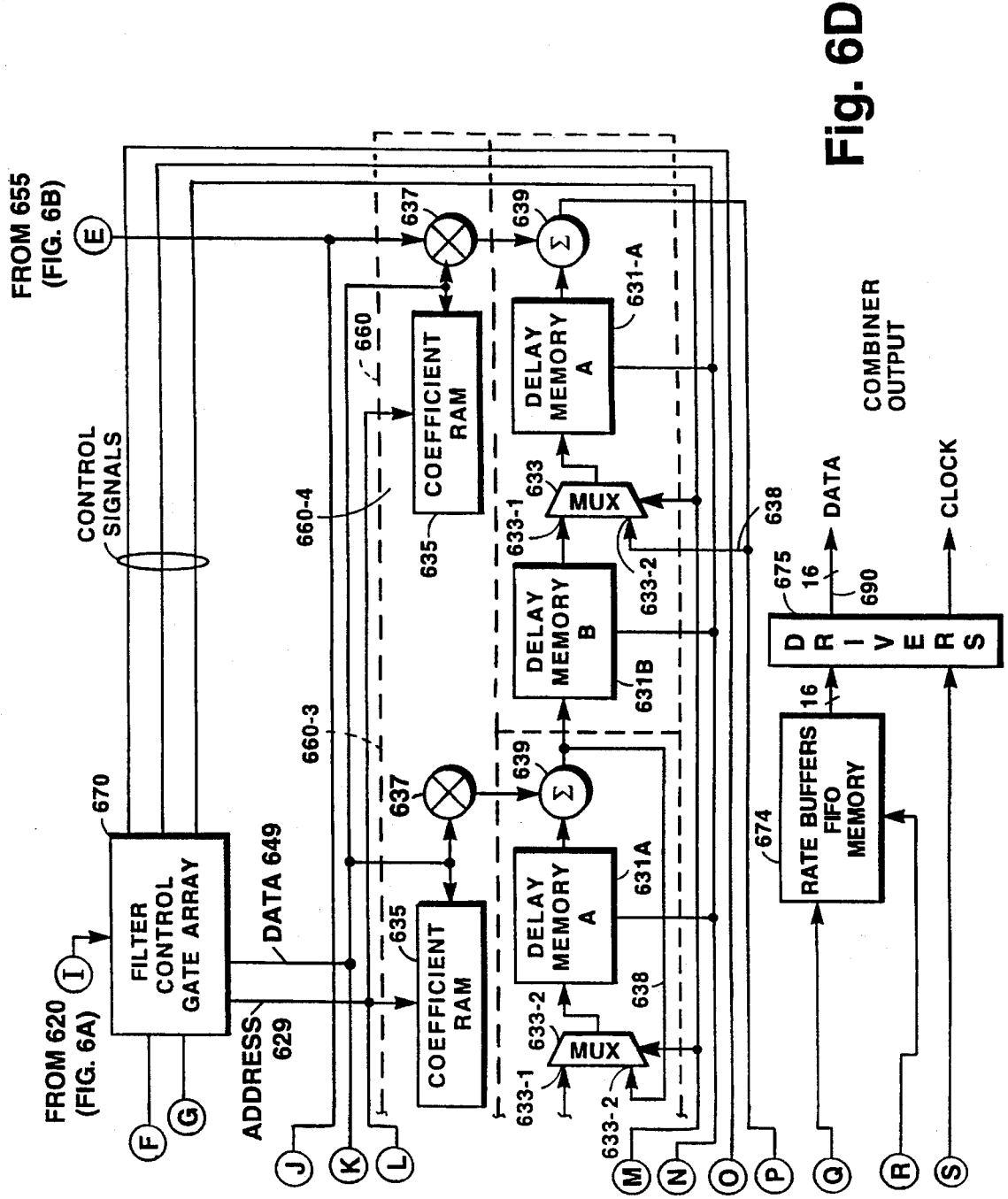

As shown in FIGS. 4 and 5, the basic architecture of an overlap and add filter 420 is similar to that of a finite impulse response (FIR) filter. However, the filter of the invention differs from a conventional FIR filter by the use of feedback multiplexers 433 and long delay line elements (memories 431) between filter taps. The lengths of memories 431 are configured by the system controller during initialization and a determined in accordance with the filter's decimation rate M, referenced above.

The decimation rate is defined as:

M=round to nearest integer (input sample rate/2*channel sample rate).

For the 30 kHz channelizer example, the decimation rate is therefore $M=3.072*10^7/(2*5.0*10^4)=307$. For the 200 kHz channelizer example, the decimation rate is $M=2.56*10^7/(2*3*10^5)=43$. Within memories 431, the length of memory 431B is the decimation rate M; the length of memory 431A, which represents the filter 'overlap' is equal to N-M, where N is the size of the FFT processor. Therefore, for the example of the 30 kHz channelizer, the length of a respective memory 431A or 'overlap' is 512–307=205 samples, while, in the case of 200 kHz channels, the overlap length of memory 431A is 64–43=21 samples.

As pointed out above, input data is processed in 'blocks' of M samples of data, which are clocked out of FIFO 413 in bursts at a rate higher that the input sample clock rate, in order to accommodate the size of the FFT processor, which requires N samples. Namely, N>M implies that the overlap and add filter must operate at a clock rate faster than one-half the input sample rate. The minimum clock rate of the filter may be defined as:

filter sampling rate=input sample rate*N/(2*M).

Thus, for the 30 kHz channelizer, the minimum sampling rate is 25.62 MHz, while the minimum sampling rate for the 200 kHz channelizer is 19.05 MHz.

In order to process each block of M input samples, N clock signals are required to supply the FFT processor with a sufficient number of data samples for FFT processing. During the first M of the N clock signals, M samples are clocked through rate buffer 413 and half band filter 419 and into shift register 422. During this time frame, a state machine-implemented filter control unit 440 applies a select control signal over link 442 to the select input port 433S of multiplexer 433 to select its upper port 433-1, and a clock signal via link 444 to the delay memories 431, so that data is shifted from left to right through each of the delay memories 431. For the remaining N-M ones of the N data samples, gate control unit 440 causes each multiplexer 433 to select its lower port 433-2, so that data is not clocked out of rate buffer memory 413 and there is not shifting of data through the delay memories 431B. Namely, data is not shifted from left to right through the shift register, as only the memories 431A are clocked. This clocking of the memories 431A is the mechanism used to effect filter overlap diagrammatically illustrated in the functional flow of FIG. 5.

More particularly, during the N clock times, the outputs of the delay memories 431A are multiplied by the filter coefficients stored in coefficient memories 435 of the four tap stages 430-1 . . . 430-4. The first N coefficients are stored in the coefficient memory 435 of tap stage 430-1; the second N coefficients are stored in the coefficient memory 435 of tap stage 430-2; the third N coefficients are stored in the coefficient memory 435 of tap stage 430-3; and the fourth N coefficients are stored in the coefficient memory 435 of tap stage 430-4. It should be observed that the number of tap stages is not limited to four or any other number. More stages may be employed to increase the length of the filter, so as to reduce aliasing within the channel, increase channel selectivity and allow a reduction in channel sample rate. Namely, the rate at which data is shifted into the convolutional filter operator corresponds to the decimation rate M of the filter and thereby controls the sharpness of filter roll-off. Setting M for optimized system performance depends upon FFT processing capability and the available sampling rate of the digitizing components (A-D converter 103).

OVERLAP AND ADD FFT PROCESSOR

As the four sets of coefficient-weighted data samples generated by filter stages 430-1 . . . 430-4 are summed together via summation stages 432, 434 and 436 they produce an N sample aliased convolved data sequence which is stored in a dual port RAM 451 comprised of RAM sections 451A and 451B, so that it may be applied to an FFT processor 460. The addressing of dual port RAM 451 and the operation of the FFT processor are controlled by a state machine, preferably implemented as a logic gate array 468.

The processing rate of the FFT processor is defined as:

FFT rate=1/(channel sample rate).

For the 30 kHz channelizer example under consideration, generation of a 512-point FFT with a 50 kHz channel sample rate requires 20 microseconds, while the rate at which a 64-point FFT must be generated for a 200 kHz channelizer with a 300 kHz sample rate is 3,333 microseconds. Since currently available typical FFT devices do not operate at theses speeds, then in order to maintain throughput, FFT processor 460 contains a plurality of FFT engines (three— 461, 462, 463 in the illustrated example) that have been programmed with the proper FFT size associated with the signal processing parameters of interest. Implementing the FFT processor with three engines decreases the FFT revisit time for the 512 point FFT processor to 60 microseconds, and 10 microseconds for the 64 point FFT processor and allows the FFT processors to maintain real time data throughput with currently available integrated circuits.

In accordance with a preferred embodiment, the FFT engines employ a radix-4 (block floating point) algorithm having FFT sizes that are a power of 4. For a 512 point FFT processor, production of all 512 frequency bins is carried out by using two 256-point FFTs that are preceded by a decimation-in-frequency radix-2 butterfly. To generate the even bins of an N-point FFT using an N/2 point FFT, it is necessary that:

$$X[2k]=FFT(x[n]+x[n+N/2])$$

where x[n] is the N-point input sequence of the FFT, k is the FFT bin number and X[k] is an FFT bin sample. For the case of a 512-point FFT, The samples are read out of dual port RAM 451 and supplied to arithmetic logic unit (ALU) 453, which, under the control of FFT control logic unit 468 sums the data samples x[n] and x[n+N/2]. During this time a downstream numerically controlled oscillator, modulator 455, the output of which is may be driven by the output of the ALU 453, is disabled by FFT control logic gate array 468. The sum value is supplied to FFT processor 460 which generates the FFT of the even frequency bins, i.e. X[2k]= FFT(x[n]+x[n+N/2]), set forth above.

For generating the odd bins of an N-point FFT, the following equation is employed:

$$X[2k+1]=FFT((x[n]-x[n+N/2])*W_N^n),$$

where $W_N=e^{-j*2*p1/N}$.

In order to generate a 512-point FFT for the odd bins, as odd bin data samples are read out of dual port RAM 451, arithmetic logic unit (ALU) 453 is controlled by FFT control logic unit 468 to take the difference between the data samples x[n] and x[n+N/2]. This difference is multiplied by $W_N^n$ by numerically controlled oscillator, modulator 455 and clocked into FFT processor 460, which generates the FFT of the odd frequency bins, i.e. $X[2k+1]=FFT((x[n]-x[n+N/2])*W_N^n$.

In the case of a 200 kHz channelizer, which employs a 64-point, power-of-four FFT engine, neither ALU 453 nor oscillator 455 is required, so they are disabled by FFT control logic unit 468.

As described earlier, the FFT engines 460 employ a block floating point algorithm, outputting a four bit scaling factor with the complex FFT data. This scaling factor is fed to a scaling logic circuit 466 to control a barrel shift circuit 490, to which the output of the FFT engine is coupled. Barrel shift circuit 470 adjusts the data as it is read out from the FFT engines in order to ensure that consecutive FFTs are aligned to the same scale. The output of barrel shift circuit 471 is coupled to a dual port RAM 473.

As described in the above-referenced Crochiere text, the output of the Fourier transform operator (here the FFT engines of processor 460) is multiplied by a complex exponential $W_N^{-kmM}$, where M is the decimation rate, k is the FFT bin number, and m is the FFT (block) number (i.e. for the first FFT generated, m=0; for the next FFT, m=1; for the third FFT, m=2; etc.). The decimation rate M is programmed into the FFT's control logic unit during initialization. To execute an equivalent operation, the channelizer of FIG. 4 uses the following identity:

$$x[((n-r))_N]=FFT(W_N^{-rk}*X[k])$$

where x[n] is the FFT input sequence, as set forth above, and $x[((n-r))_N]$ is the circular shift of x[n] by r modulo N. In the illustrated embodiment of FIG. 4, r=mM.

Rather than perform the complex multiplication downstream of the FFT, control logic unit 468 controllably addresses dual port RAM 473, so as to access processed data values in an order that effects a circular shifting of the FFT's input data sequence.

Once FFT-processed data for each channel (frequency bin) has been written into dual port RAM 473, FFT control logic unit 468 signals an attendant time division multiplexed (TDM) bus interface circuit 475 to assert the data onto TDM bus 480 so that it may be applied to attendant processors 113 (FIG. 3) on the TDM bus. Such processors correspond to processors 113, referenced previously, and may comprise digital signal processors which are operative to demodulate and extract voice or data from the channel data.

Data on the TDM bus 480 is divided into a plurality of time slots (e.g. 400 time slots per TDM frame). The TDM bus may be driven by a 20 Mhz clock, which allows a single time slot to be used to output a single channel of data up to a 50 kHz sample rate. If a higher channel sample rate is required, multiple time slots may be assigned to a single channel. For example, a 300 kHz sample rate would be allocated six time slots. Time slots may be allocated dynamically by the system controller, which configures the channelizer with all active time slots. If data is available in dual port RAM 473 and the time slot is active, the channelizer outputs the data via buffer unit 481 and a data available signal on TDM bus 480. All digital signal processors collecting data from that time slot will read data from the TDM bus. The bus connected processors are synchronized to the TDM bus by a conventional framing signal, so that the processors 113 (FIG. 3) will know the correct time slot from which to read data.

OVERLAP AND ADD COMBINER (FIG. 6)

Figure 9:
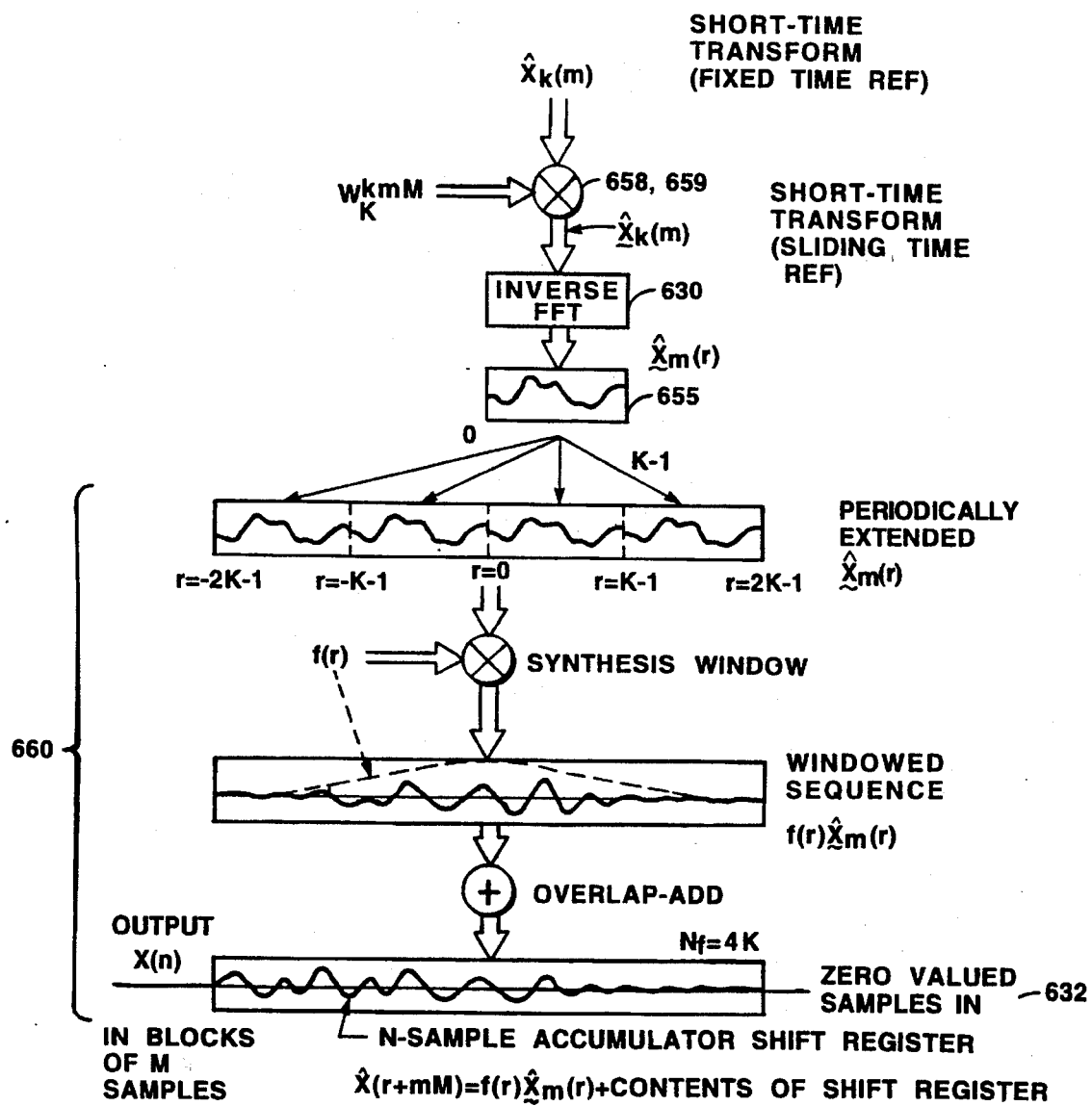
FIG. 9 is a functional diagram associated with the signal processing mechanism executed by the overlap and add combiner of FIG. 6.

FIG. 6 diagrammatically illustrates the signal processing architecture of a multichannel combiner 131, which is complementary to the wideband channelizer having the overlap and add filter structure of FIG. 4, described above. As in the case of the channelizer, the signal processing functionality of multichannel combiner essentially corresponds and is functionally equivalent to the signal processing flow diagram shown in FIG. 9, which corresponds to FIG. 7.20 of the above referenced Crochiere text.

Like the overlap and add channelizer shown in FIG. 4, described above, combiner unit 131 employs a practical implementation that allows real-time processing of multiple digital voice or data signals, and performs frequency translation and signal combining to an IF (intermediate frequency) output sample rate. The implementation of FIG. 6 provides fully programmable control of the system parameters via a standard VMEbus interface 601, 603 and channelized data collection over a custom, time division multiplexed (TDM) data bus 605.

As in the above description of the channelizer of FIG. 4, the overlap and add combiner of FIG. 6 will be described for non-limitative examples of a 400 channel/30 kHz system which can be used in a NADC (TDMA) cellular system, and a 50 channel/200 kHz system which can be used with the European GSM cellular standard. For 30 kHz channels, a sample rate of 50 kHz is assumed. For 200 kHz, a 300 kHz sample rate is assumed. Channelized data is received by the combiner as analytic baseband signals. Channel sample rates depend upon the combiner's filter design.

The combiner architecture of FIG. 6 employs a custom TDM bus 610 for collecting data for a large number of channels at relatively high data rates, since the aggregate data rate from all channels typically exceeds the bus bandwidth of the VMEbus 605 and other standard bus protocols. TDM bus 610 has its clock set at 20 MHz, so as allow 400 time slots per frame. Each time slot can transfer a single channel of data up to the above-referenced 50 kHz sample rate. For higher rates, multiple slots per frame can be assigned to a single source. As noted above with reference to the TDM bus of the channelizer of FIG. 4, a 300 kHz sample rate would require six slots per frame, since each slot handles a sample rate of 50 kHz (and six times 50 kHz is 300 kHz).

The sources of the channelized data that are asserted onto the TDM bus are DSP processors 113 (FIG. 3) that format (e.g. to a cellular standard) and modulate incoming voice or data signals from an attendant telephone network, thereby providing a baseband analytic signal. Each data source is assigned one or more time slots during which it will transfer a single complex sample when requested by the combiner. No two sources can be allocated the same time slot. Time slots are assigned by a system controller (a separate CPU on VMEbus 605) during system initialization. The system controller also programs the combiner to specify all times slots that contain valid data.

A sample from each DSP processor is requested via control signals applied to TDM bus 610 from a TDM bus controller 611 (logic array-implemented state machine) and associated buffer/drivers 613. This sample is written into a dual port RAM buffer 615 via bus buffer unit 617. TDM bus control logic unit 611 synchronizes addressing of RAM buffer 615 to framing signals of the TDM bus, thereby insuring that each channel is written to the proper address in dual port RAM 615.

When the combiner has collected data from all operative channels, the TDM bus controller 611 couples control signals via link 612 to an FFT control logic unit 620, causing FFT control logic unit 620 to initiate FFT processing. Like logic gate array 468 in the channelizer, FFT control logic unit 620 is a state machine preferably implemented as a logic gate array. Complementary to the forward FFT processor functionality of the channelizer of FIG. 4, the combiner of FIG. 6 causes an inverse FFT to be performed. In terms of a practical implementation, however, generation of an inverse FFT is effected using a forward FFT, as will be described.

FFT PROCESSOR

The FFT processor, shown at 630, is configured to have a size equal to the next 'power of two' greater than the number of channels to be combined. As noted above, four hundred 30 kHz channels specify a 512-point FFT, while fifty 200 kHz channels require a 64-point FFT. FFT size is programmed into the FFT engines during initialization. The channel rate also specifies the FFT processing rate in accordance with the equation:

FFT rate=1/(channel sample rate)

As explained previously, a 50 kHz sample rate for 30 kHz channels requires that a 512-point FFT be generated every 20 microseconds, while a 300 kHz sample rate requires a 64-point FFT every 3.333 microseconds. Since currently available typical FFT devices do not operate at these speeds, to maintain throughput, FFT processor 630 contains a plurality of FFT engines (e.g. three—631, 632, 633 in the illustrated example) that have been programmed with the proper FFT size associated with the signal processing parameters of interest. Implementing FFT processor 630 with plural engines reduces the FFT revisit time for the 512 point FFT processor to 60 microseconds, and 10 microseconds for the 64 point FFT processor.

A 512-point inverse FFT requires 512 samples; however, there are only 400 time slots. These 400 time slots are centered in the 512 bin window of FFT processor 630. Control logic unit 620 causes zeros to be written sequentially into an FFT engine for the first 56 bins. For the next 400 bins, data may be read from dual port RAM 615 for the active channels. If the channel is not an active channel, control logic unit 620 will write a zero into that bin. The identities of those channels that are active are programmed into control logic unit 620 during system initialization. For the last 56 bins, zeros are written into those bins. (For a 64-point FFT, zeros are written into the first and last seven FFT bins allowing fifty 200 kHz channels.)

To provide built-in-test capability, test data may be written into one or more bins via VMEbus 605. For this purpose, a first-in-first-out (FIFO) memory 635, dedicated for test capability, is coupled to bus 605 via transceiver unit 601, so as to allow a CPU on the VMEbus to write a test signal to the combiner. In addition, the system controller can program FFT control logic unit 620 to read data from FIFO memory 635 rather than dual port RAM 615 for specific bins. Test data may be written into the first and last seven FFT bins, thus leaving fifty 200 kHz channels available for incoming active data channels.

In order to generate an inverse FFT using a forward FFT, the following identity is used:

$$x[n]=K*FFT(X[((-k))_K])$$

where $x[n]$ is the inverse FFT of $X[k]$, n=sample number, k=FFT bin, K=FFT size, and $X[((-k))_K]$ reversing the order of the sequence, $X[k]$, by modulo K. By generating a mirror of the input data to the FFT about bin 0, the forward FFT becomes an inverse FFT scaled by the FFT size. Control logic unit 620 addresses the input dual port RAM 615 in a reverse order when writing data into the FFT engines.

As in the channelizer implementation of FIG. 4, to generate a 512-point FFT in the combiner architecture of FIG. 6, the FFT engines employ a radix-4 (block floating point) algorithm having FFT sizes that are a power of four. To generate the even bins of an N-point FFT using an N/2 point FFT, it is necessary that:

$$X[k]=G[k]+H[k]*W_N^k$$

where $X[k]$=N-point FFT of an input sequence $x[n]$, k =FFT bin, N=FFT size (512), $G[k]$=N/2-point FFT of the even samples of $x[n]$, $H[k]$=N/2-point FFT of the odd samples of $x[n]$, and $W_N=e^{-j*2*\pi/N}$. As in the channelizer of FIG. 4, a 512-point FFT for the combiner is generated from two 256-point FFTs.

The N/2-point FFTs are generated from even and odd samples of the 512-point input sequence. In the architecture of FIG. 6, a first (upper, as viewed in the Figure) FFT data dual port RAM 641 stores $G[k]$. A second (lower as viewed in the Figure) FFT data dual port RAM 642 stores $H[k]*W_N^k$. Multiplication of $H[k]$ and $W_N^k$ is performed by a numerically controlled oscillator, modulator (NCOM) 651 for k=0 to 255. To process the first 256 bins of a 512-point FFT, the output of RAM 641 is summed with the output of RAM 642 by means of an arithmetic logic unit (ALU) 655. Since $W_N^k=-W_N^{k-N/2}$ for k=256 to 511, the output of RAM 642 is subtracted from the output of RAM 641 for the remaining 256 bins of the 512-point FFT.

In order to accommodate the propagation delay through NCOM 651 and ensure that the proper pair of samples are processed by ALU 655, a set of delay registers 657 are coupled in the output path from dual port RAM 641 to the ALU. (For the 200 kHz channels, a 64-point FFT is used. Since 64 is a power of 4, NCOM 651, dual port RAM 642, and ALU 655 are not necessary and are disabled by control signals from control unit 620.)

As described in the above-referenced Crochiere text, the combiner algorithm requires the input sequence of the inverse FFT be multiplied by the complex exponential $W_K^{kmR}$, where k=input frequency bin, K=inverse FFT size, inverse FFT number (i.e. for the first inverse FFT generated, m=0; for the next FFT, m=1; etc.), R is the combiner's interpolation rate, and $W_K=e^{-j*2*\pi/K}$. Using a mathematical identity, this multiplication operation can be effected by a circular rotation of the output samples of the inverse FFT, i.e.:

$$x[((n-r))k]=\text{inverse FFT }(W_K^{-rk}*X[k])$$

where r is equal to –mR. By rotating the inverse FFT output samples by –mR, the phase shift of the complex exponential is generated. This rotation is performed by the FFT output addressing logic in FFT control logic gate array 620. The amount of rotation is preprogrammed during initialization of the combiner.

As noted earlier, the FFT engines generate FFTs using a block-floating point algorithm. The block-floating point FFT provides a scaling factor which depends upon the characteristics of the input data. Since the two 256-point FFTs used to generate a 512-point FFT may not have the same scaling factor or consecutive FFTs may not have the same scaling factor, barrel shifting circuits 658, 659 are coupled in the signal flow input paths to ALU 655. As described previously in connection with the operation of the channelizer of FIG. 4, the barrel shifters adjust the FFT data to the same scale to properly align the data for subsequent processing.

OVERLAP AND ADD FILTERING

As in the channelizer of FIG. 4, the overlap and add filter of the combiner of FIG. 6, shown at 660, comprises four filter tap stages 660-1, 660-2, 660-3 and 660-4. The FFT size and the number of stages set the overall length of the filter, which is defined by:

Filter Length=N*number of stages where N is the FFT size.

Filter 620 is designed as a real low pass filter with a cutoff frequency equal to one half the channel bandwidth. It should be observed that the filter is not limited to a four stage filter; more stages may be employed, if desired, which will increase channel selectivity, reduce aliasing within the channel and can decrease the channel sample rate. A respective stage 630-i of filter 630 is formed of one or both of memory elements 631A and 631B, a feedback multiplexer 633, a coefficient memory 635 and a multiplier 637. Each coefficient memory stores a respective set of N filter (weighting) coefficients, the number of which corresponds to the size of the FFT processor. The coefficients are downloaded to the coefficient memory 635 via the VMEbus 605 during initialization. Address inputs for the coefficient memories are supplied via links 629 from a (gate array logic-implemented) filter control state machine 670, while data inputs are coupled via data links 649.

The first N coefficients are loaded into the coefficient memory 635 of the first or left-most stage 630-1; the second N coefficients are stored in the coefficient memory 635 of tap stage 630-2; the third N coefficients are stored in the coefficient memory 635 of tap stage 630-3; and the fourth N coefficients are stored in the coefficient memory 635 of tap stage 630-4. The output of the FFT processor from ALU 655 is distributed via link 656 to multipliers 637 of all filter stages and multiplied by the coefficients of each stage simultaneously. The outputs of multipliers 637 are coupled to adders 639, to be added to data being accumulated and shifted through the delay memories.

As in the filter of the channelizer of FIG. 4, the delay memory of each stage, with the exception of the first stage 630-1, is divided into two memory sections 631A and 631B. The first filter tap stage 630-1 does not require a delay memory section 631B, since zeros, supplied via link 632 to multiplexer 633, are shifted into the first filter stage. The length of each delay memory is determined by the filter interpolation rate, which is defined in accordance with the channel and output sample rates. The output sample rate of the combiner is given by:

Output sample rate=N*channel bandwidth.

For 30 kHz channels, the output sample rate is $3.0*10^4*512=15.36$ MHz. For 200 kHz channels, the output sample rate is $2.0*10^5*64=12.8$ MHz. The filter interpolation rate, R, is the nearest integer of the following quotient:

R=round (output sample rate/channel sample rate)

As noted above, for the example of using 30 kHz channels with a 50 kHz channel sample rate, the interpolation rate is R=307; for 200 kHz channels with a 300 kHz channel sample rate, the interpolation rate is R=43. The length of each of delay memory sections 631A is R, while the length of delay memory section 631B, also known as the filter overlap, is given by:

overlap=(N-R)

Thus, for 30 kHz channels, the filter overlap (N-R) is 205; for 200 kHz channels the filter overlap (N-R) is 21. The interpolation rate R also specifies the required signal processing rate of the overlap and add filter. The minimum clock rate the filter must process data to maintain throughput is given by:

filter processing rate=output rate*N/R

For a 30 kHz channel system the minimum rate is 25.62 MHz. For a 200 kHz channel system, the rate is 19.05 MHz.

For every N samples output by the inverse FFT processor, overlap and add filter 660 outputs R samples. For the first R samples of each inverse FFT, filter control state machine 670, selects, via select control link 671, a first or upper input port 633-1 through the multiplexers 633. During this time, all data is shifted or clocked via clock control link 669 from left to right, as viewed in FIG. 6, and summation values produced by adder 639 in the last stage 630-4 of the filter are input to a half band filter 672.

For the remaining N-R samples, a second or lower port 633-2 of each multiplexer 633 is selected, and the outputs of adders 639 are fed back via links 638 to the delay memory sections 631A. During this time memory sections 631B are not shifted and the data at the last stage 630-4 is not clocked into the half band filter. Again, as in the channelizer filter, the feedback of the last N-R samples provides the filter overlap.

HALF BAND FILTER AND RATE BUFFER

The output of filter 630 is coupled to a half band filter 672, since RF transmitter exciters typically require a real signal rather than a complex one. Half band filter 630 is configured as an integrated circuit that provides complex to real data conversion, which doubles the output sample rate. Although the entirety of the combiner of FIG. 6 could be implemented as a completely real system, this would require all sample rates, processing rates and FFT sizes to be doubled, increasing complexity and cost. A rate buffer FIFO memory 674 is coupled to the output of half band filter 672 to allow a continuous flow of data from the combiner. Data stored in FIFO memory 674 is coupled via output driver unit 675 to an output data link 690 for application to D-A converter 133 (FIG. 3) of the transmit side of the transceiver site.

As noted earlier, overlap and add filter 630 provides a burst of R samples every N clock cycles, and the output of FIFO 674 provides a continuous flow of data at the real output sample rate. Additionally, a half full flag from the FIFO is supplied over a control signal line 673 to a control logic circuit, to indicate to the TDM bus interface unit 611, via control links distributed among the respective state machines, when to request data. When the quantity of data stored in FIFO 674 falls to less than half the capacity of the FIFO, the flag becomes inactive, which signals the TDM bus interface to request channel data from its active channels and being processing to maintain the continuous flow of output data.

As in the channelizer architecture of FIG. 4, respective oscillators are provided for each output sample rate required. For the present example of a combiner capable of processing either 30 kHz or 200 kHz channels, respective 30.72 MHz and 25.6 MHz (2*output sample rate) clocks 676 and 677 are provided. During initialization of the combiner by the system controller, the proper oscillator is selected by an associated control logic unit 678.

An additional set of logic circuits is included to generate additional clock signals employed by the combiner. As in the channelizer architecture of FIG. 4, the clock output of a high rate oscillator (~200 MHz) 681 is divided down by counters 682 and 683 to generate the necessary filter processing clock, TDM bus clock, and FFT engine system clock.

CHANNELIZER USING POLYPHASE FILTERS
(FIG. 7)

Figure 7A:
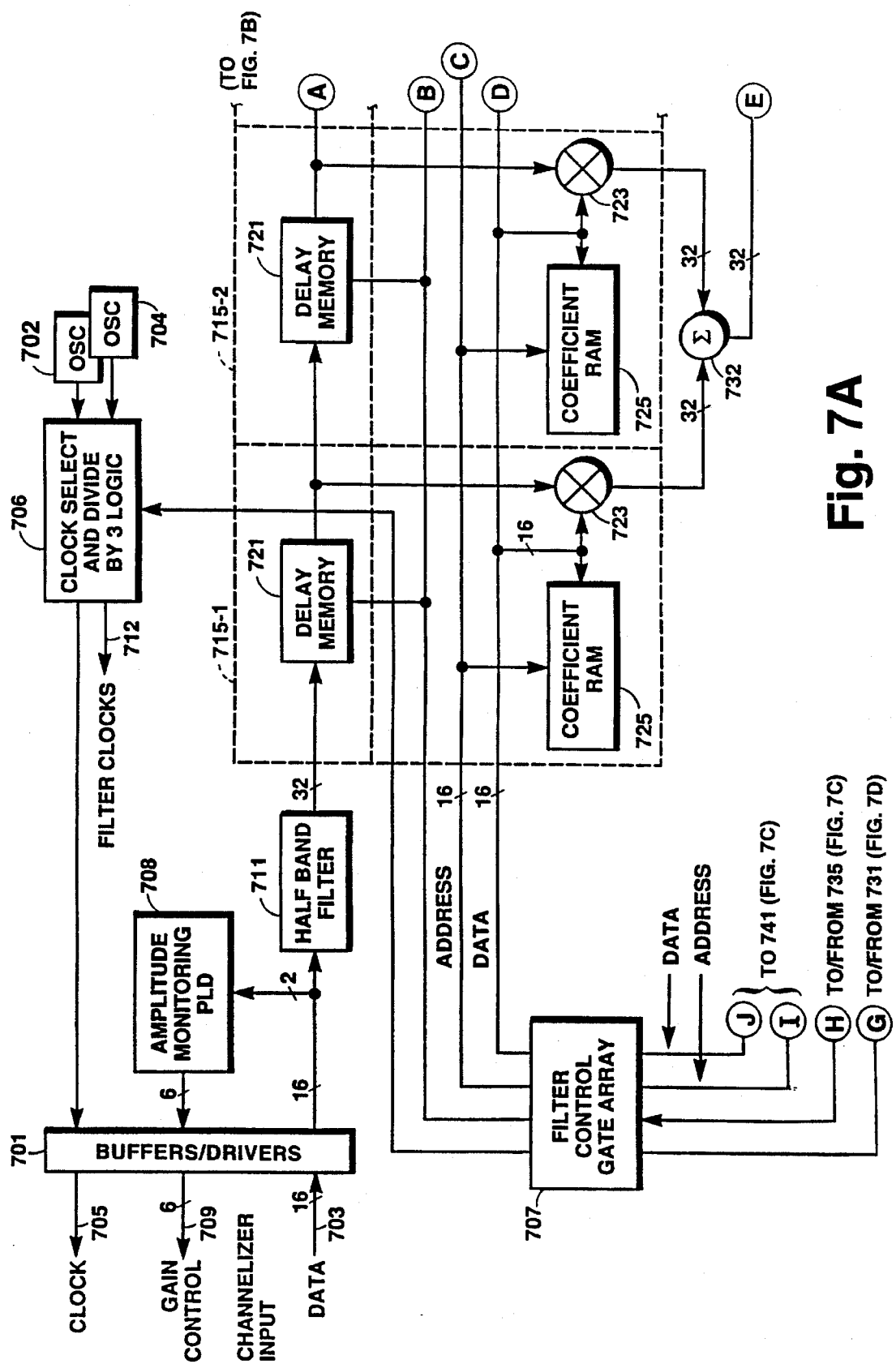
FIG. 7 diagrammatically illustrates the configuration of a channelizer employing a polyphase filter in accordance with a second embodiment of the invention.
Figure 7B:
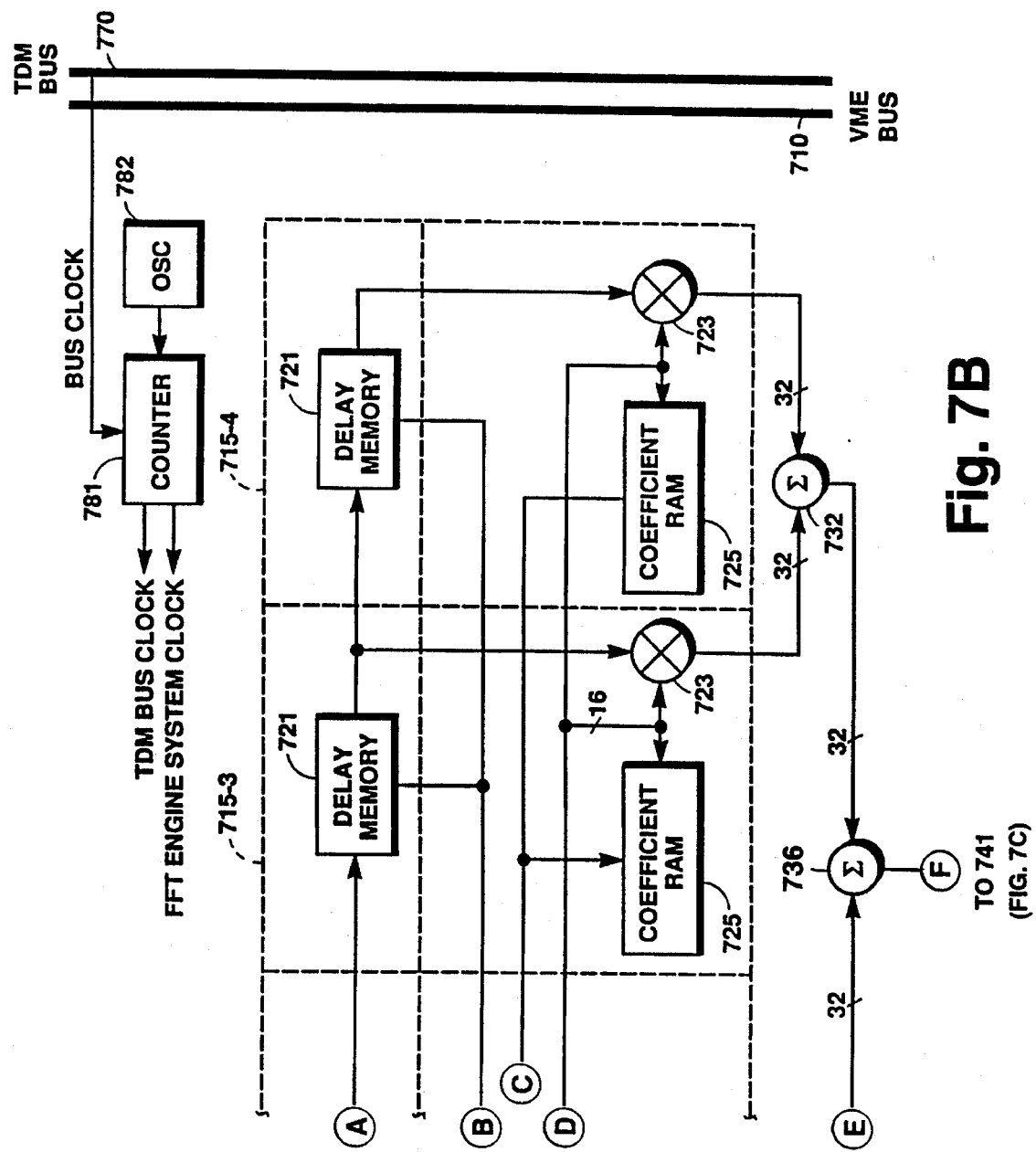
Figure 7D:
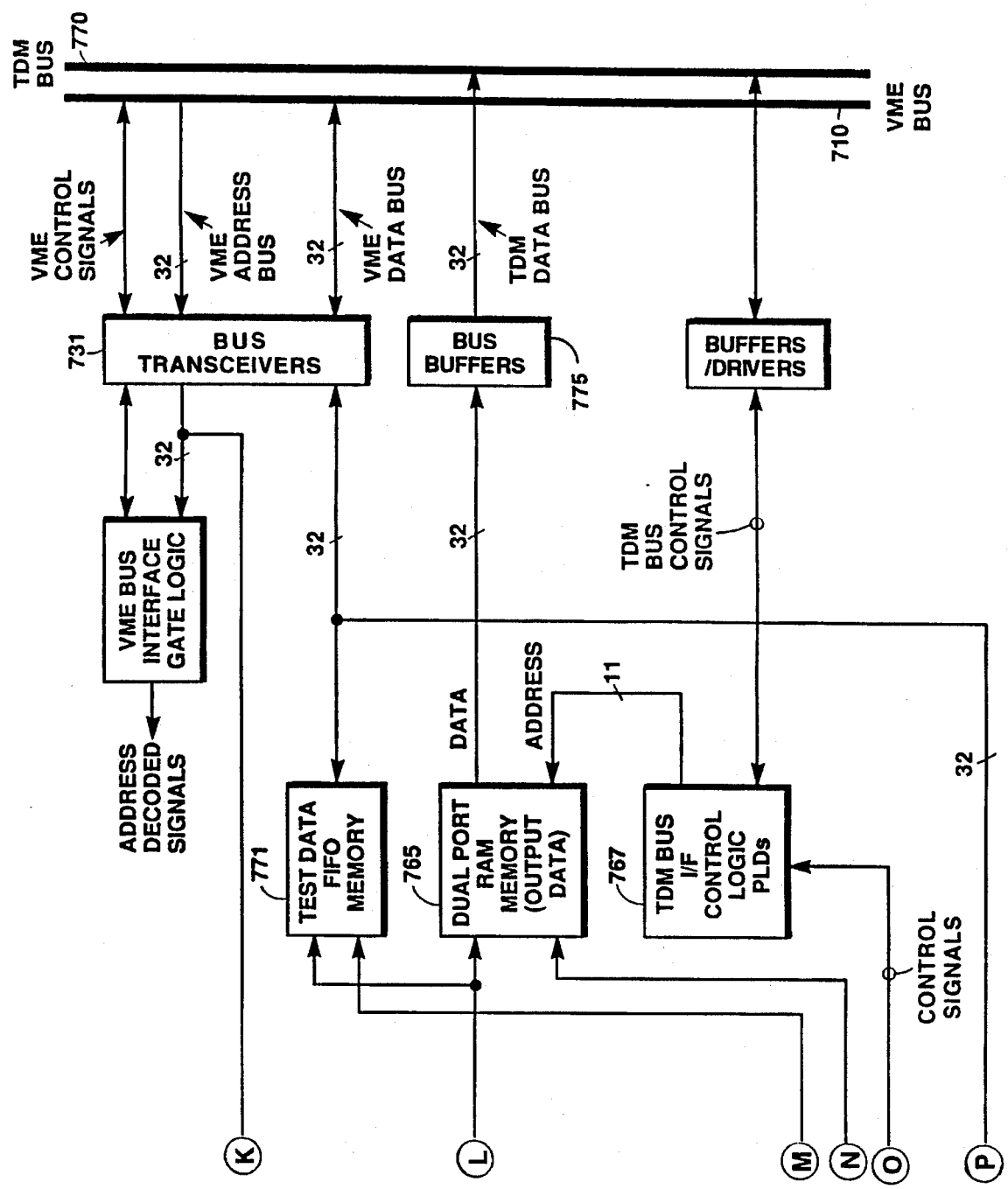

A second embodiment of the wideband channelizer of the present invention is configured as a polyphase filter structure, which is functionally expressible by the signal processing flow diagram shown in FIG. 7.15 of the above referenced Crochiere text. Again, since algorithms for each of the filter transform functions (respectively employed by polyphase implementations of the filter structure contained in channelizer 111 and combiner 131 of FIG. 3) are rigorously set forth in the Crochiere text, they will not be repeated here; for a more detailed description of the signal processing relationships involved attention may be directed to the Crochiere text.

As in the overlap and add channelizer embodiment of FIG. 4, the architecture of an FFT-based polyphase filter bank analysis (channelizer) system of FIG. 7 accepts real-time wide band IF (intermediate frequency) signals and performs frequency translation and channelization to a number of individual narrow baseband analytic signals. The polyphase filter channelizer provides full programmable control of the system parameters via a standard VMEbus interface and channelized data distribution over a custom, time division multiplexed (TDM) data bus. (Keeping with the foregoing examples, the description of the polyphase filter embodiment to follow will address specifics of a 400 channel/30 kHz system, and a 50 channel/200 kHz system.)

A characteristic of the polyphase channelizer architecture is that the input sample rate is an integral multiple of the channel sample rate. This implies that the channel sample rate must be a multiple of the channel bandwidth. In the present description the channels are oversampled by a factor of two; therefore, a 60 kHz sample rate for 30 kHz channels is assumed, and a 400 kHz sample rate for 200 kHz channels is assumed. Channelized data is distributed by the channelizer as analytic baseband signals.

HALF BAND FILTER, AND AMPLITUDE MONITORING

The channelizer's input interfaces via a buffer/driver unit 701 to upstream wide band digital receiver, in particular, to the digital data output link 703 from A-D converter 103 of FIG. 3. Clock line 705 supplies the sample clock which is to be used for the converter's encoding clock. The input sample clock rate is determined by the number of channels being received and the bandwidth of those channels. An amplitude monitoring logic circuit 708 monitors the two most significant bits of the input data from the digital receiver's A-D converter on data link 703, in order to provide automatic-gain control of the input signal. This insures that the full dynamic range of the A-D converter 103 in the receiver is being utilized. Amplitude monitoring logic circuit outputs a control word to the receiver on link 709 which may be used to control a digital attenuator upstream of the A-D converter.

Respective oscillators 702, 704 are provided for each input rate the channelizer may use. A select and divide-by-two logic circuit 706, under the control of a filter control state machine 707, is coupled to oscillators 702, 704. During initialization, a system controller (a CPU on VMEbus 710) configures the channelizer to select the proper oscillator. The oscillator clock is also divided down to generate a clock on output clock link 712 to drive the channelizer's shift register delay memory, to be described.

The input samples on data link 703 are clocked into a half band filter 711, which is configured as a finite impulse response (FIR) filter that performs a real-to-complex conversion of the input data. Half band filter 711 also decimates by two, reducing the clock rate of the data by half. The complex samples are then fed into a shift register 713 of a polyphase filter 715. In particular, the output of half band filter 711 is clocked into a delay memory 721 of a shift register 713 of a first filter stage 715-1 of filter 715. The length of each delay memory 721 is equal to the FFT size in the channelizer. The output of each delay memory 721 is applied to coefficient multipliers 723. Coefficient multipliers 723 and other hardware components operate at a rate that is I times the clock rate of shift register 713, where I is the oversampling factor. As mentioned above, the oversampling factor equals two. This implies that each sample at the output of the delay memories is multiplied to two (I=2) filter coefficients, prior to being clocked into the next delay memory.

In the filter architecture of FIG. 7, polyphase filter 715 consists of four filter stages 715-1, 715-2, 715-3 and 715-4. The FFT size, oversampling factor, and the number of stages establish the overall length of the filter. The length of the filter is:

Filter Length=I*N*S where S is the number of filter taps. As noted earlier, more filter stages increase channel selectivity and reduce aliasing within the channel. Filter coefficients are downloaded to coefficient RAMs 725 by way of filter control gate array 707, as supplied via bus transceivers 731 from VMEbus interface 710. The RAM 725 of each stage 715-i stores N coefficients. The filter coefficients are decimated by the number of taps (here—four) when loading coefficient RAMs 725 in accordance with the following decimation equation:

$$a_\alpha[n]=c[S*n+\alpha], \text{ for } n=0 \text{ to } N*I-1$$

where c(n) is the sequence of filter coefficients, $\alpha$ is the tap number ($\alpha$=0 to S-1), and $c_\alpha[n]$ are the coefficients to be loaded into the $\alpha$ tap. For example, coefficient RAM 725 of the first filter tap stage 715-1 is loaded with the following coefficients:

$$c_0[n]=\{c[0], c[4], c[8], c[12]\ldots c[I*N-S]\}$$

The outputs of coefficient multipliers 723 are then summed by way of adders 732, 734 and 736 and written into a dual port RAM 740, which comprises memory sections 741 and 742.

FFT PROCESSOR

The FFT processor of the polyphase combiner has effectively the same configuration and operates in substantially the same manner as the FFT processor of the overlap and add channelizer of FIG. 4, described above. After N samples have been written into dual port RAM 740, filter control unit 707 couples control signals over link 719 to (gate array logic-implemented state machine) FFT control unit 735 to begin FFT processing. Within FFT processor 750, a set of three FFT engines 751, 752, 753 have previously been programmed with the proper FFT size during initialization.

As in the overlap and add channelizer of FIG. 4, the FFT engines employed in the polyphase combiner use a radix-4 algorithm and generate FFT sizes that are a power of four. In the architecture of FIG. 7, all 512 bins of the FFT are produced by using two 256-point FFTS preceded by a decimation-in-frequency radix-2 FFT butterfly.

In the course of generating the even bins of the FFT, data samples are read from dual port RAM 740 and fed into arithmetic logic unit (ALU) 743. ALU 743 sums the values of x[n] and x[n+N/2] and couples the sum directly to the FFT processor, as a numerically controlled oscillator, modulator (NCOM) 745 is disabled during even bin processing. For odd bin processing FFT control logic unit 735 configures ALU 743, via control link 744, to take the difference of x[n] and x[n+N/2]. This difference value is multiplied by $W_N^n$ by NCOM 745 and clocked into an FFT engine, which produces odd bins of the 512-point FFT. (For a 200 kHz channelizer, which requires a 64-point FFT as a power of four, ALU 743 and NCOM 745 are not necessary and are disabled by FFT control unit 735.)

As previously described, FFT engines 751, 752, 753 use a block floating-point algorithm and output a four bit scaling factor with complex FFT data. The scaling factor is used to control a donwstream barrel shifter 761 under the control of a scaling logic circuit 762. Again, the barrel shifter is employed to adjust the data as it is read from the FFT engines, in order to insure that data from consecutive FFTs are aligned to the same scale. From the barrel shifter 761, the data is written into a dual port RAM memory 765.

As noted above, the channelizer algorithm requires that the output of the FFT processor be multiplied by a complex exponential, $W_N^{-kmM}$, where M=decimation rate, k=FFT bin number, and m=FFT (block) number (i.e. m=0, for the first FFT generated; m=1 for the next FFT generated; etc.). Namely, using the following identity:

$$x[((n-4))_n]=FFT(W_N^{-rk}*X[k])$$

where x[n] is the FFT input sequence, and $x[((n-r))_N]$ is the circular shift of x[n] by r modulo N, the channelizer performs an equivalent operation. Here, mM=r. Rather than multiply the complex exponential downstream of the FFT processor, the channelizer's FFT control logic unit 735 controllably addresses dual port RAM 765, so as to access processed data values in an order that effects a circular shifting of the FFT's input data sequence.

Once FFT-processed data for each channel (frequency bin) has been written into dual port RAM 765, FFT control logic unit 735 signals an attendant time division multiplexed (TDM) bus interface circuit 767 to assert the data onto TDM bus 770, so that it may be applied to attendant digital signal processors on the bus, which are operative to demodulate and extract voice or data from the channel data.

The polyphase channelizer can also be configured to write one or more channels of data into a test FIFO memory 771. FIFO memory 771 allows a CPU on VMEbus 710 to collect and analyze channel data without interfacing to custom TDM bus 710.

Once data from each channel has been written into dual port RAM 765 from the FFT engines, the FFT control logic unit 735 signals TDM bus interface logic circuit 767 to distribute the data to digital signal processors on the bus, which are operative to demodulate and extract voice or data from the channel data. A bus buffer unit 775 is coupled between dual port RAM 765 and TDM bus 770. Data on the TDM bus may be divided into 400 time slots per frame. The TDM bus clock may be set at 24 MHz, as supplied by a counter circuit 781, as driven by a high speed reference oscillator 782, thereby allowing a single time slot to be used to output a single channel of data up to a 60 kHz sample rate. If a higher channel sample rate is needed, multiple time slots may be assigned to a single channel. For example, as described above, a 400 kHz sample rate would be allocated seven time slots.

Time slots may be allocated dynamically by the system controller. The channelizer is configured by the controller with all active time slots. If data is available in the dual port RAM and the time slot is active, the channelizer outputs the data and a data available signal on TDM bus 770. All processors collecting data from that time slot will read data from the TDM bus. The processors are synchronized to the TDM bus 770 by a framing signal, so that the processors will know the proper time slot(s) from which to read data.

POLYPHASE COMBINER (FIG. 8)

Figure 8:
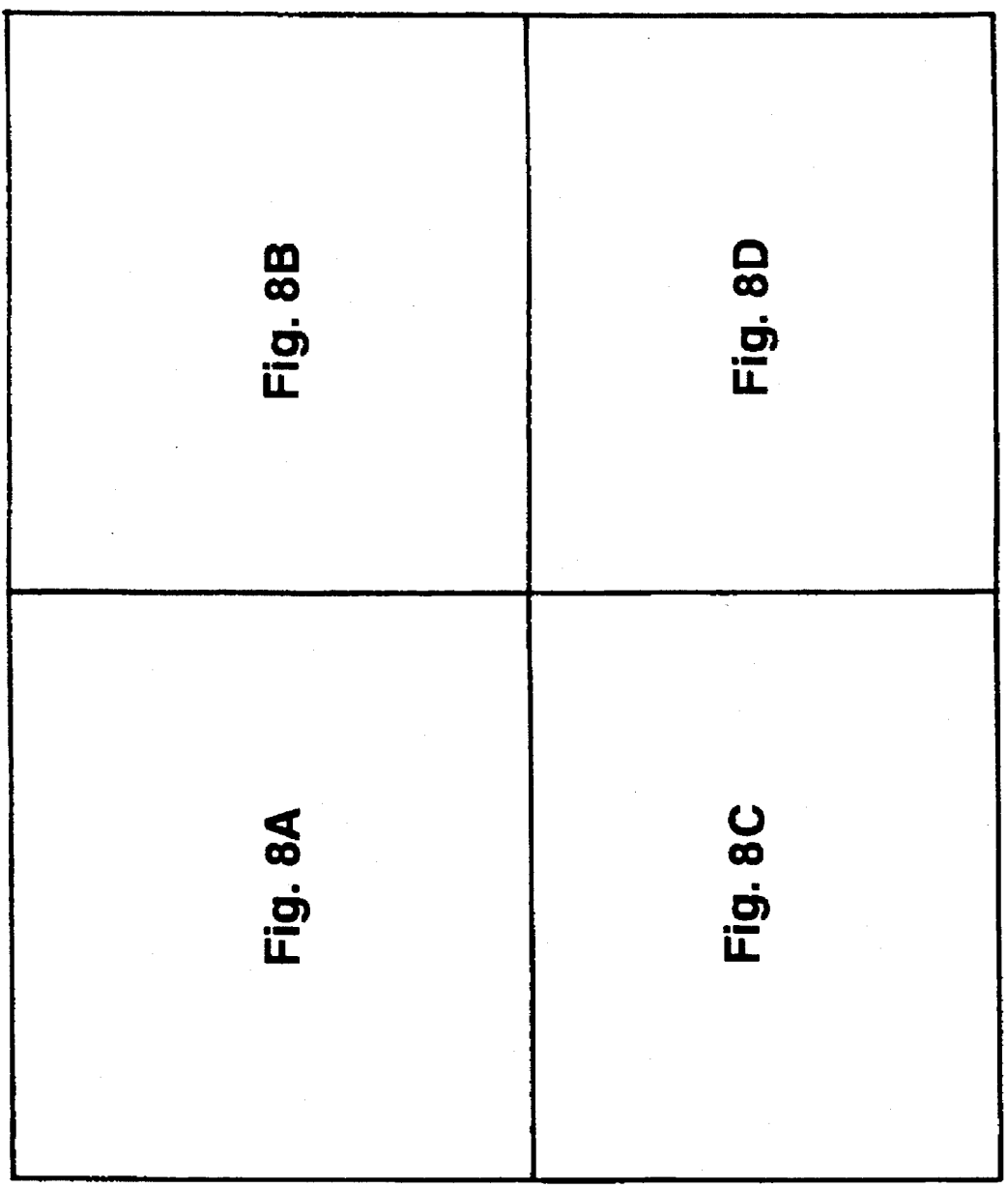
FIG. 8 diagrammatically illustrates the configuration of a combiner employing a polyphase filter in accordance with the second embodiment of the invention.
Figure 8A:
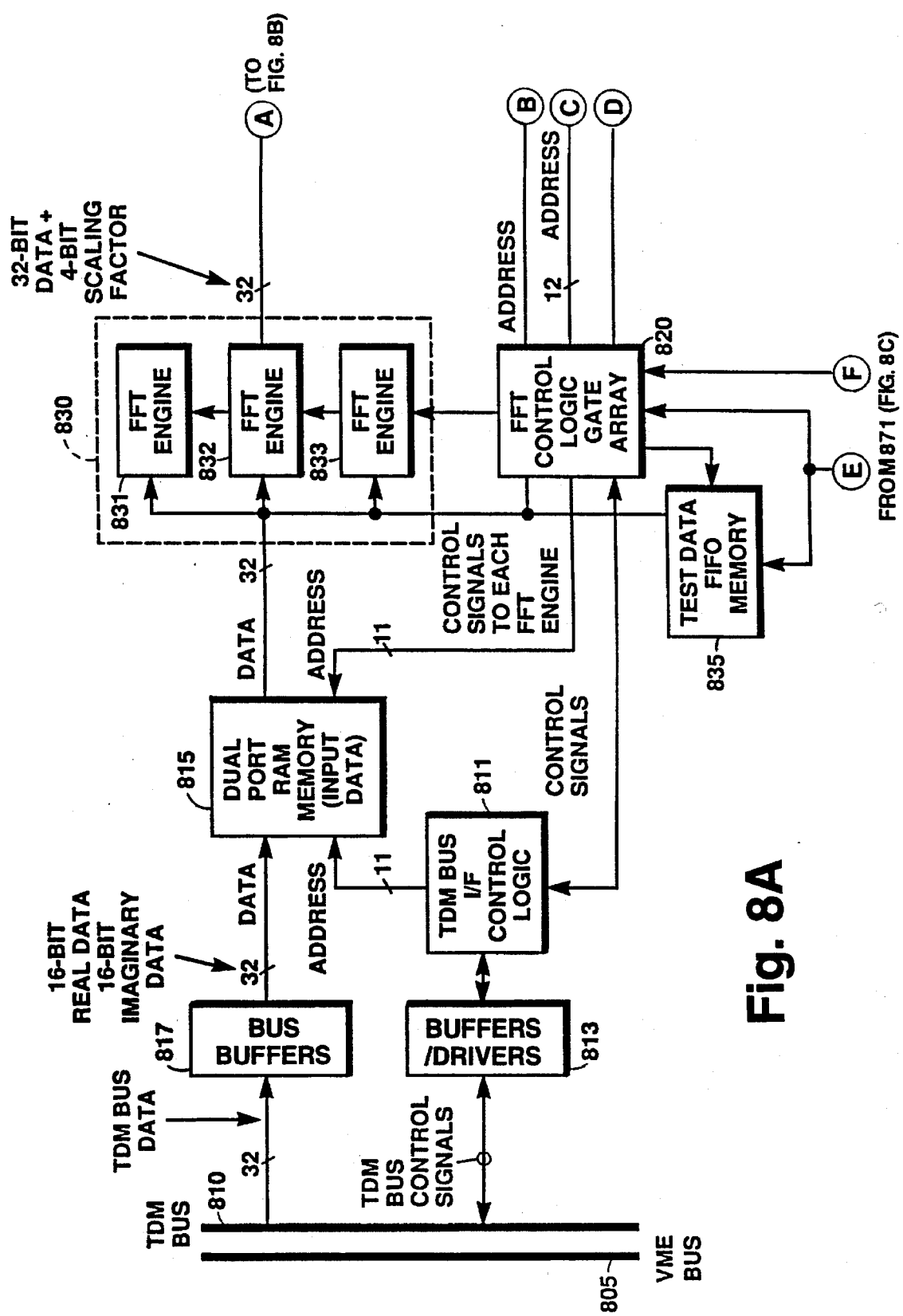
Figure 8B:
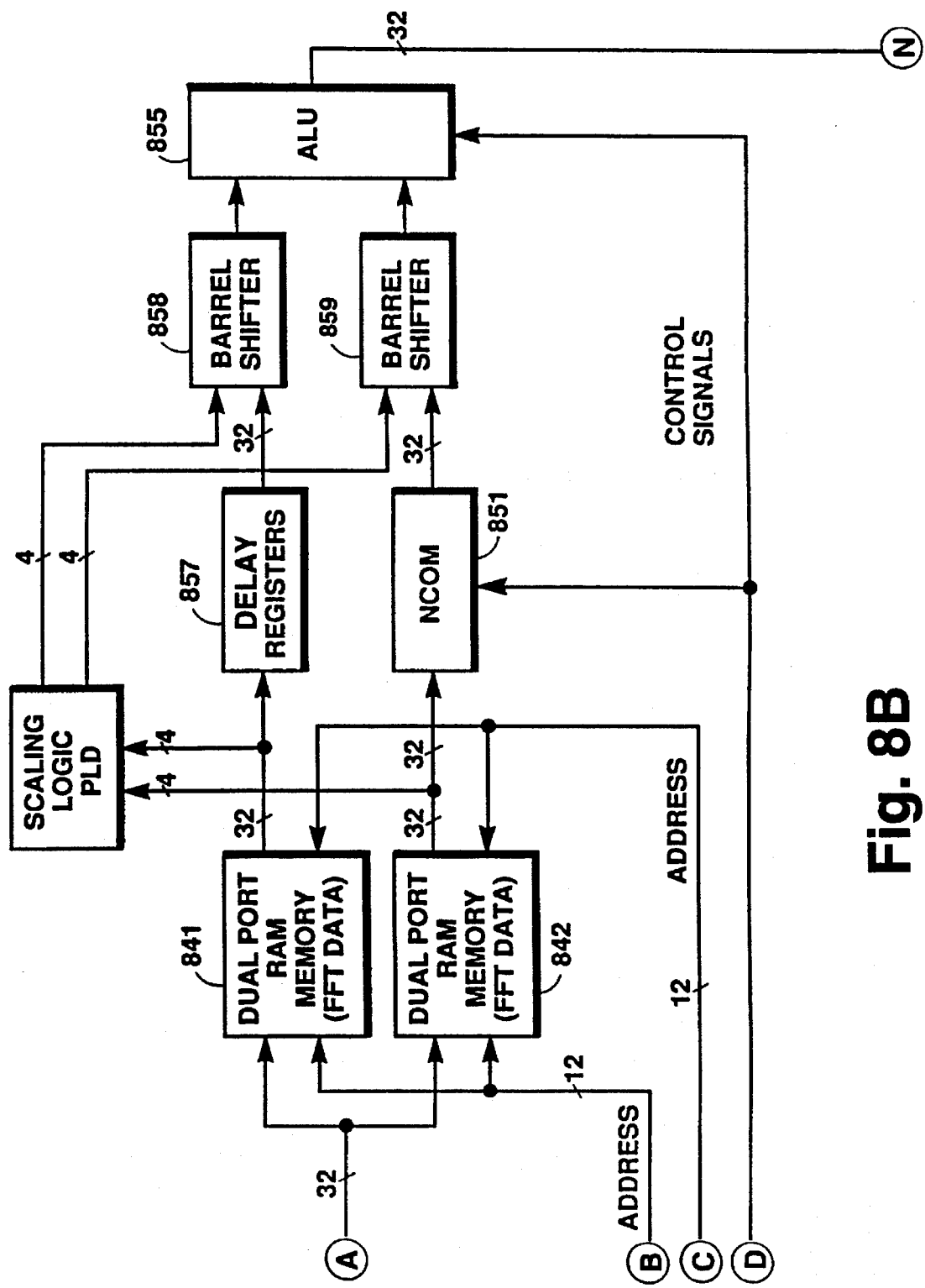
Figure 8C:
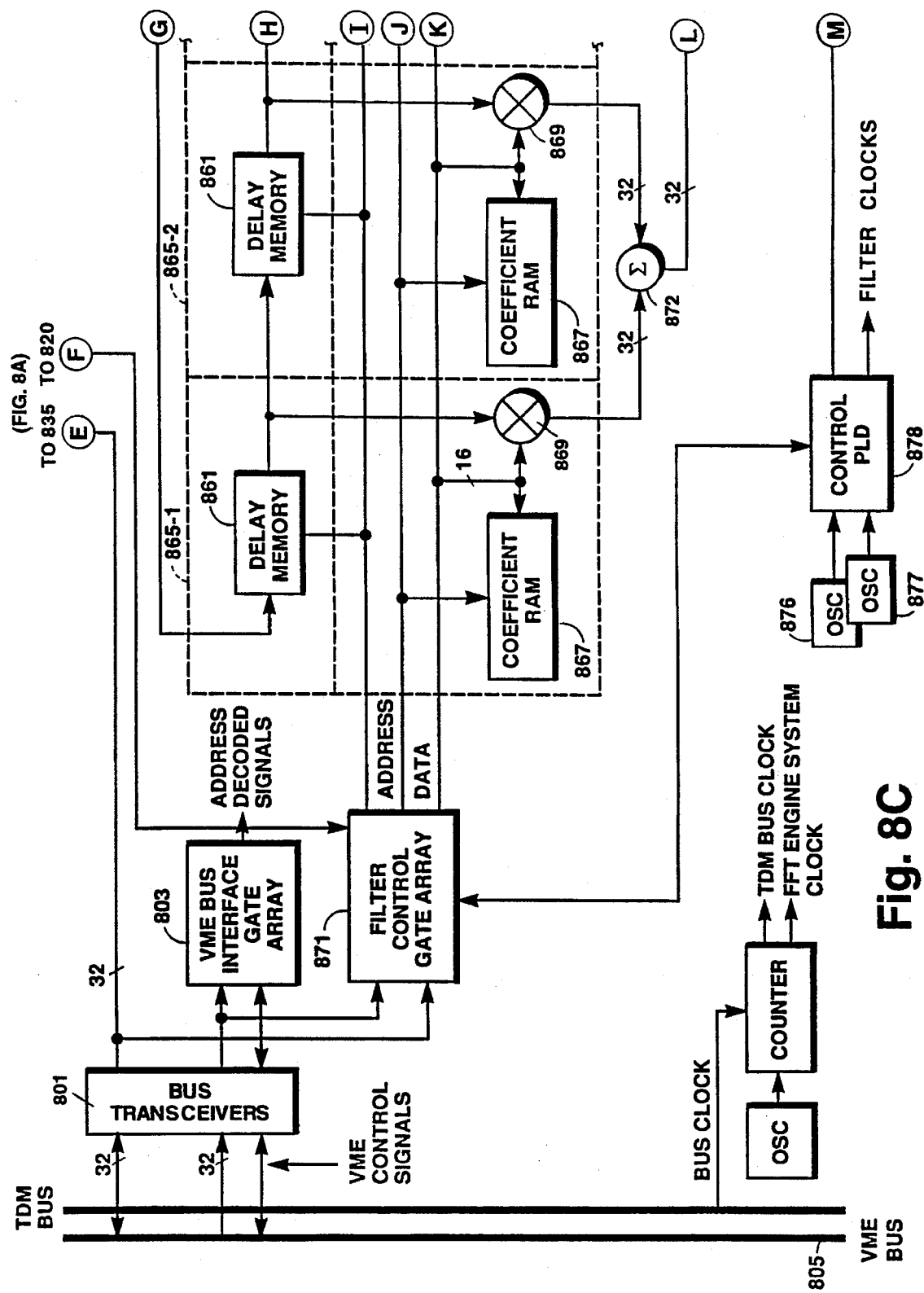
Figure 8D:
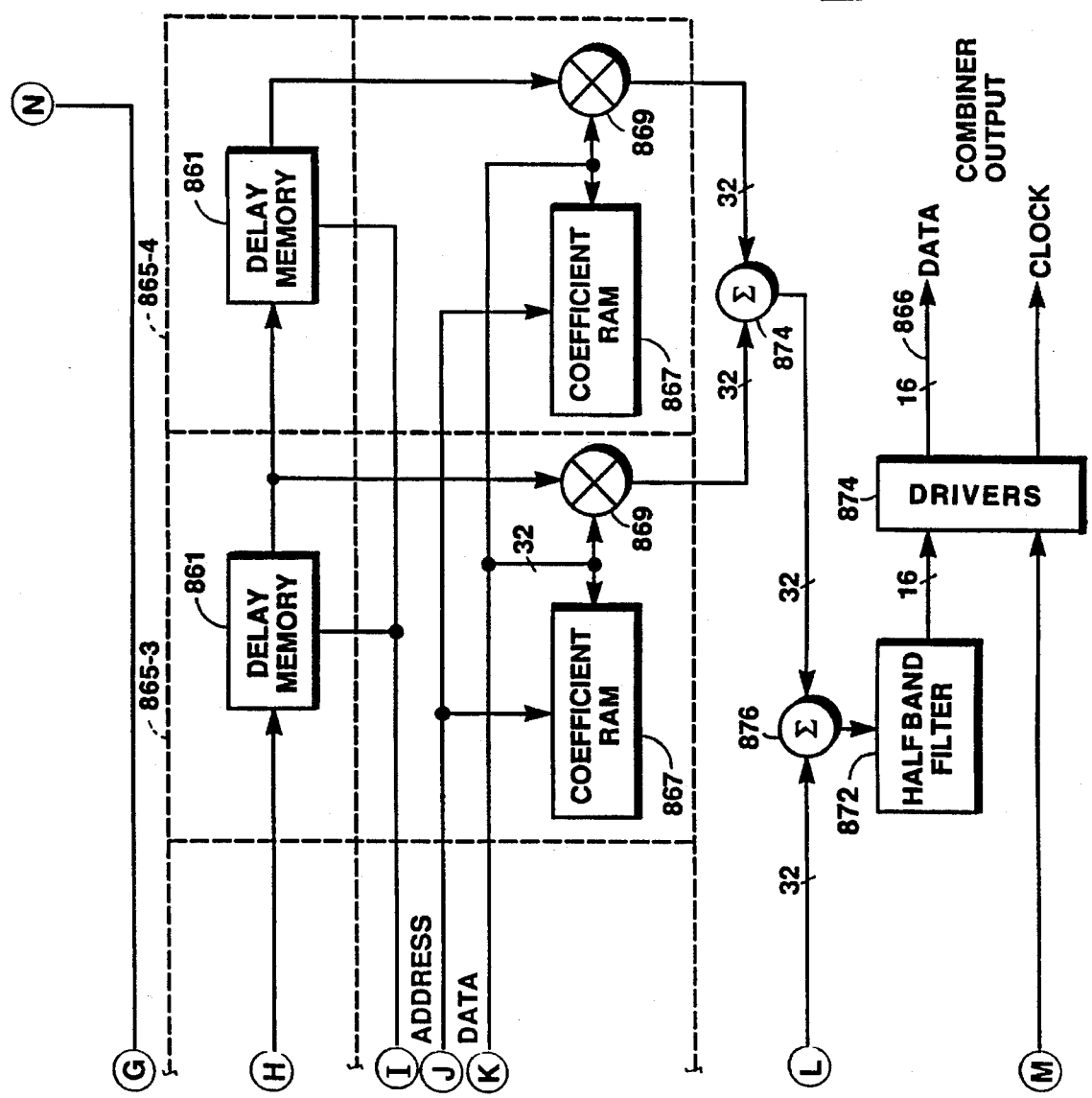

FIG. 8 diagrammatically illustrates the signal processing architecture of a polyphase implementation of combiner 131, which is complementary to the wideband channelizer having the polyphase filter structure of FIG. 7, described above. A characteristic of the polyphase combiner is that the output sample rate is an integer multiple of the channel sample rate. This implies that the channel sample rate must be a multiple of the channel bandwidth. In the present description the channel is oversampled by a factor of two; therefore, a 60 kHz sample rate for 30 kHz channels is assumed, and a 400 kHz sample rate for 200 kHz channels is assumed. Channelized data is received by the polyphase combiner as analytic baseband signals.

Like the overlap and add channelizer shown in FIG. 8, described above, the polyphase combiner employs a practical implementation that allows real-time processing of multiple digital voice or data signals, and performs frequency translation and signal combining to an IF (intermediate frequency) output sample rate. The implementation of FIG. 8 provides fully programmable control of the system parameters via a standard VMEbus interface 801, 803 and channelized data collection over a custom, time division multiplexed (TDM) data bus 805.

Again, as in the previous description of the channelizer, the polyphase will be described for nonlimitative examples of a 400 channel/30 kHz system which can be used in a NADC (TDMA) cellular system, and a 50 channel/200 kHz system which can be used with the European GSM cellular standard. For 30 kHz channels, a sample rate of 60 kHz is assumed. For 200 kHz, a 400 kHz sample rate is assumed. Channelized data is received by the combiner as analytic baseband signals. Channel sample rates depend upon the combiner's filter design.

The combiner architecture of FIG. 8 employs a custom TDM bus 810 for collecting data for a large number of channels at relatively high data rates, since the aggregate data rate from all channels typically exceeds the bus bandwidth of the VMEbus 805 and other standard bus protocols.

To implement a transceiver system employing the polyphase combiner (and channelizer) it is convenient to set the TDM bus 810 clock equal to 24 MKz, so as to allow 400 time slots per frame, with each time slot transferring a single channel of data up to the above-referenced 60 kHZ sample rate. This clock rate differs from the TDM bus clock rate of the overlap and add combiner/channelizer embodiment of the transceiver system which has been given as an example of a 50 kHz channel sample rate. The clock rate is not limited to this value but has been selected in order to provide a simplified example of an implementation of a transceiver system.

For higher rates, multiple slots per frame can be assigned to a single source. As noted above with reference to the TDM bus of the channelizer of FIG. 8, a 400 kHz sample rate would require seven slots per frame.

The sources of the channelized data that are asserted onto the TDM bus are DSP processors that format (e.g. to a cellular standard) and modulate incoming voice or data signals from an attendant telephone network, thereby providing a baseband analytic signal. Each data source is assigned one or more time slots during which it will transfer a single complex sample when requested by the combiner. No two sources can be allocated the same time slot. Time slots are assigned by a system controller (a separate CPU on VMEbus 805) during system initialization. The system controller also programs the combiner to specify all times slots that contain valid data.

A sample from each DSP processor is requested via control signals applied to TDM bus 810 from a TDM bus controller 811 (logic array-implemented state machine) and associated buffer/drivers 813. This sample is written into a dual port RAM buffer 815 via bus buffer unit 817. TDM bus control logic unit 811 synchronizes addressing of RAM buffer 815 to framing signals of the TDM bus, thereby insuring that each channel is written to the proper address in dual port RAM 815.

When the combiner has collected data from all operative channels, the TDM bus controller 811 couples control signals via link 812 to an FFT control logic unit 820, causing FFT control logic unit 820 to initiate FFT processing. FFT control logic unit 820 is a state machine preferably implemented as a logic gate array. Complementary to the forward FFT processor functionality of the channelizer of FIG. 7, the polyphase combiner of FIG. 8 causes an inverse FFT to be performed. As in the overlap and add combiner of FIG. 6, in terms of a practical implementation, however, generation of an inverse FFT is effected using a forward FFT, as will be described.

FFT PROCESSOR

The FFT processor, shown at 830, is configured to have a size equal to the next 'power of two' greater than the number of channels to be combined. As noted above, four hundred 30 kHz channels specify a 512-point FFT, while fifty 200 kHz channels require a 64-point FFT. FFT size is programmed into the FFT engines during initialization. The channel rate also specifies the FFT processing rate in accordance with the equation:

FFT rate=1/(channel sample rate)

As explained previously, a 60 kHz sample rate for 30 kHz channels requires that a 512-point FFT be generated every 16,667 microseconds, while a 400 kHz sample rate requires a 64-point FFT every 2.5 microseconds. Since currently available typical FFT devices do not operate at these speeds, to maintain throughput, FFT processor 830 contains a plurality of FFT engines (e.g. three—831, 832, 833 in the illustrated example) that have been programmed with the proper FFT size associated with the signal processing parameters of interest. Implementing FFT processor 830 with three engines reduces the FFT revisit time for the 512 point FFT processor to 50 microseconds, and 7.5 microseconds for the 64 point FFT processor.

As described previously, a 512-point inverse FFT requires 512 samples; however, there are only 400 time slots. These 400 time slots are centered in the 512 bin window of FFT processor 830. Control logic unit 820 causes zeros to be written sequentially into an FFT engine for the first 56 bins. For the next 400 bins, data may be read from dual port RAM 815 for the active channels. If the channel is not an active channel, FFT control logic unit 820 will write a zero into that bin. The identities of those channels that are active are programmed into control logic unit 820 during system initialization. For the last 56 bins, zeros are written into those bins. (For a 64-point FFT, zeros are written into the first and last seven FFT bins allowing fifty 200 kHz channels.)

To provide built-in-test capability, test data may be written into one or more bins via VMEbus 805. For this purpose, a first-in-first-out (FIFO) memory 835, dedicated for test capability, is coupled to bus 805 via transceiver unit 801, so as to allow a CPU on the VMEbus to write a test signal to the combiner. In addition, the system controller can program FFT control logic unit 820 to read data from FIFO memory 835 rather than dual port RAM 815 for specific bins. Test data may be written into the first and last seven FFT bins, thus leaving fifty 200 kHz channels available for incoming active data channels.

To generate an inverse FFT using a forward FFT, FFT control logic unit 820 addresses the input dual port RAM 815 in a reverse order when writing data into the FFT engines.

As in the overlap and add combiner implementation of FIG. 6, to generate a 512-point FFT in the combiner architecture of FIG. 8, the FFT engines employ a radix-4 (block floating point) algorithm having FFT sizes that are a power of four. As in the combiner of FIG. 6, a 512-point FFT for the combiner is generated from two 256-point FFTs. The N/2-point FFTs are generated from even and odd samples of the 512-point input sequence.

In the architecture of FIG. 8, a first (upper, as viewed in the Figure) FFT data dual port RAM 841 stores holds G[k]. A second (lower as viewed in the Figure) FFT data dual port RAM 842 stores H[k]. Multiplication of H[k] and $W_N^k$ is performed by a numerically controlled oscillator, modulator (NCOM) 851 for k=0 to 255. To process the first 256 bins of a 512-point FFT, the output of RAM 841 is summed with the output of RAM 842 by means of an arithmetic logic unit (ALU) 855. Since $W_N^k = -W_N^{k-N/2}$ for k=256 to 511, the output of RAM 842 is subtracted via the NCOM from the output of RAM 841 for the remaining 256 bins of the 512-point FFT.

In order to accommodate the propagation delay through NCOM 851 and ensure that the proper pair of samples are processed by ALU 855, a set of delay registers 857 are coupled in the output path from dual port RAM 841 to the ALU. (For the 200 kHz channels, a 64-point FFT is used. Since 64 is a power of 4, NCOM 851, dual port RAM 842, and ALU 855 are not necessary and are disabled by control signals from control unit 820.)

As pointed out above, with reference to the Crochiere text, the combiner algorithm requires the input sequence of the inverse FFT be multiplied by the complex exponential, $W_K^{kmR}$, where k=input frequency bin, K=inverse FFT size, m=inverse FFT number, R is the combiner's interpolation rate, and $W_K = e^{-j*2*\pi/K}$. Using a mathematical identity, this multiplication operation can be effected by a circular rotation of the output samples of the inverse FFT, i.e.:

$$x[((n-r))_K] = \text{inverse FFT}(W_K^{-rk} * X[k])$$

where r is equal to −mR. By rotating the inverse FFT output samples by −mR, the phase shift of the complex exponential is generated. This rotation is performed by the FFT output addressing logic in FFT control logic gate array 820. The amount of rotation is preprogrammed during initialization of the combiner.

Again, the FFT engines generate FFTs using a block-floating point algorithm, which provide a scaling factor that depends upon the characteristics of the input data. Since the two 256-point FFTs used to generate a 512-point FFT may not have the same scaling factor or consecutive FFTs may not have the same scaling factor, barrel shifting circuits 858, 859 are coupled in the signal flow input paths to ALU 855. As described previously in connection with the operation of the combiner of FIG. 6, the barrel shifters are operative to adjust the FFT data to the same scale to properly align the data for subsequent processing.

POLYPHASE FILTER

The output of the FFT, as supplied by ALU 855, is clocked into a delay memory 861 of a shift register 863 of a first filter stage 865-1 of a filter 865. The length of each delay memory 861 is equal to the FFT size. The output of each delay memory 861 is applied to a respective coefficient multiplier 869. Coefficient multipliers 869 and other hardware components operate at a rate that is I times the clock rate of shift register 863, where I is the oversampling factor. As mentioned above, the oversampling factor equals two. This implies that each sample at the output of the delay memories is multiplied to two (I=2) filter coefficients, prior to being clocked into the next delay memory.

In the filter architecture of FIG. 8, polyphase filter 865 consists of four filter stages 865-1, 865-2, 865-3 and 865-4. The FFT size, oversampling factor, and the number of stages establish the overall length of the filter. The length of the filter is:

Filter Length=N*S where S is the number of filter taps. As noted earlier, more filter stages increase channel selectivity and reduce aliasing within the channel. Filter coefficients are downloaded to coefficient RAMs 867 by way of filter control gate array 871, as supplied via bus transceivers 801 from VMEbus interface 803. The RAM 867 of each stage 865-i stores N coefficients. The filter coefficients are decimated by the number of taps (here—four) when loading coefficient RAMs 867 in accordance with the following decimation equation:

$$c_\alpha[n] = c[S*n+\alpha], \text{ for } n=0 \text{ to } N-1$$

where c(n) is the sequence of filter coefficients, α is the tap number (α=0 to S-1), and $c_\alpha[n]$ are the coefficients to be loaded into the α tap. For example, coefficient RAM 867 of the first filter tap stage 865-1 is loaded with the following coefficients:

$$c_0[n]=\{c[0], c[4], c[8], c[12] \ldots c[N-S]\}$$

The outputs of coefficient multipliers 869 are then summed by way of adders 872, 874, 876 and applied to a half-band filter 872.

HALF BAND FILTER AND RATE BUFFER

As in the combiner of FIG. 6, half band filter 672 is employed, since RF transmitter exciters typically require a real signal rather than a complex one. Half band filter 872 is configured as an integrated circuit that provides complex to real data conversion, which doubles the output sample rate. Although the entirety of the combiner of FIG. 8 could be implemented as a completely real system, this would require all sample rates, processing rates and FFT sizes to be doubled, increasing complexity and cost.

The output of half band filter 872 is coupled via output driver unit 874 to an output data link 866 for application to D-A converter 133 (FIG. 3) of the transmit side of the transceiver site. As in the combiner architecture of FIG. 6, respective oscillators are provided for each output sample rate required. For the present example of a combiner capable of processing either 30 kHz or 200 kHz channels, respective 30.72 MHz and 25.6 MHz (2*output sample rate) clocks 876 and 877 are provided. During initialization of the combiner by the system controller, the proper oscillator is selected by an associated control logic unit 878.

An additional set of logic circuits is included to generate additional clock signals employed by the combiner. As in the combiner architecture of FIG. 6, the clock output of a high rate oscillator (~200 MHz) is divided down by counters 882 and 883 to generate the necessary filter processing clock, TDM bus clock, and FFT engine system clock.

As will be appreciated from the foregoing description, the limited channel capacity and substantial hardware requirements associated with signal processing architectures currently employed by multichannel wireless communication (e.g. cellular) service providers are successfully obviated by the multichannel transceiver apparatus of the present invention, which reduces the amount of hardware required to provide broad coverage for an increased (full spectrum) capacity cellular transceiver site by applying convolutional—decimation spectral analysis techniques to each of a wideband multichannel signal extraction architecture and a wideband multichannel signal combining architecture. Since all of the channels of the operational communication band available to the service provider can be processed using digital processing components which operate at very high data rates that accommodate the substantial bandwidth of present day wireless communication systems, it is no longer necessary to either construct a separate narrowband signal processing unit for each channel, nor is it necessary to limit the number of channels per site to less than the full capacity of the network. The compact design of the invention allows it to be readily physically accommodated at a variety of installation sites, such as above the drop ceiling in an office building or on an electric utility pole, while having the capability of providing multichannel communication service that spans the entire channel capacity offered by the service provider, rather than only a subset of the available channels.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A transceiver apparatus for a wireless communication network containing multiple frequency communication channels for supporting real time communications among a plurality of geographically distributed first sites, by way of one or more transceiver sites, said transceiver apparatus being installable at a respective one of said one or more transceiver sites and comprising:

a receiver unit which is operative to receive a plurality of signals from a contiguous set of said multiple frequency communication channels and output a digital composite receiver signal representative of the signals received from said plurality of multiple frequency communication channels;

a Fourier transform based channelizer unit which is coupled to receive the digital composite receiver signal from said receiver unit and is operative to output, in real time, respective digital channel signals representative of the contents of respective ones of the signals received from the plurality of communication channels received by said receiver unit;

a first plurality of signal processor units, respectively associated with said digital channel signals output by said Fourier transform based channelizer unit and being operative to process respective ones of said digital channel signals and to supply processed ones of said digital channel signals at respective output ports thereof;

a second plurality of signal processor units, respectively associated with respective ones of a plurality of incoming communication signals to be transmitted over a respectively different contiguous set of multiple frequency communication channels of said network, and being operative to process respective ones of said plurality of incoming communication signals and to supply processed ones of said incoming communication signals at respective output ports thereof;

a Fourier transform-based combiner unit which is coupled to receive said processed ones of said communication signals processed by said second plurality of digital signal processor units and to output in real time, a digital combined transmit signal representative of the contents of the incoming communication signals processed by said second plurality of digital signal processor units; and a transmitter unit which is operative to transmit a multiple frequency communication channel signal in accordance with the digital combined transmit signal output by said Fourier transform-based combiner unit.

2. A transceiver apparatus according to claim 1, wherein said Fourier transform-based channelizer unit includes an overlap and add filter to which the composite signal output by said receiver unit are coupled, and an N-point fast Fourier transform-based processor coupled to the output of said overlap and add filter.

3. A transceiver apparatus according to claim 1 wherein a sampling rate of the digital channel signals output by said channelizer unit is independent of a size of the Fourier transform based channelizer unit.

4. A transceiver apparatus according to claim 1 wherein a sampling rate of the digital signal output by said receiver unit is not an integer multiple of a sampling rate of the individual digital channel signals output by said channelizer unit.

5. A transceiver apparatus according to claim 1 wherein a sampling rate of the incoming communications signals is independent of a size of the Fourier-transform-based combiner unit.

6. A transceiver apparatus according to claim 1 wherein a sampling rate of the combined signal output by said combiner is not an integer multiple of a sampling rate of the individual incoming communication signals.

7. A transceiver apparatus according to claim 1 wherein the processed communication channel signals output by said second plurality of signal processor units are connected to said Fourier transform based combiner unit via a time division multiplex (TDM) bus.

8. A transceiver apparatus according to claim 1, wherein said Fourier transform-based combiner unit includes an N-point fast Fourier transform processor coupled to receive communication channel signals processed by said second plurality of digital signal processor units and an overlap and add filter to which the output of said N-point fast Fourier transform processor are coupled.

9. A transceiver apparatus according to claim 1, wherein said Fourier transform-based combiner unit includes an N-point fast Fourier transform processor coupled to receive communication channel signals processed by said second plurality of digital signal processor units and a polyphase filter to which the output of said N-point fast Fourier transform processor are coupled.

10. A transceiver apparatus according to claim 9, wherein said polyphase filter comprises a finite impulse response filter containing a plurality of filter tap stages, each of which comprises a delay memory, so that the delay memories of successive filter tap stages are coupled in series, each filter tap stage further including a coefficient memory which stores a plurality of N weighting coefficients, and a multiplier which is operative to multiply respective weighting coefficients stored in said coefficient memory by data sample values from a signal flow path through said delay memories, and a summation stage for summing together products output by respective multipliers of said filter tap stages, the output of said summation stage being coupled to said multichannel transmitter unit.

11. A transceiver apparatus according to claim 1 wherein the digital channel signals output by the channelizer unit are connected to the first plurality of signal processor units via a time division multiplex (TDM) bus.

12. A transceiver apparatus according to claim 11 wherein the processed communication channel signals output by said second plurality of signal processor units are connected to said Fourier transform based combiner unit via a time division multiplex (TDM) bus.

13. A transceiver apparatus according to claim 1, wherein said Fourier transform-based channelizer unit includes a polyphase filter to which the digital signals output by said multichannel receiver unit are coupled and an N-point fast Fourier transform-based processor coupled to the output of said polyphase filter.

14. A transceiver apparatus according to claim 13, wherein said polyphase filter comprises a finite impulse response filter containing a plurality of filter tap stages, each of which comprises a delay memory, so that the delay memories of successive filter tap stages are coupled in series, each filter tap stage further including a coefficient memory which stores a plurality of N weighting coefficients, and a multiplier which is operative to multiply respective weighting coefficients stored in said coefficient memory by data sample values from a signal flow path through said delay memories, and a summation stage for summing together products output by respective multipliers of said filter tap stages, the output of said summation stage being coupled to said N-point fast-Fourier transform processor.

15. A transceiver apparatus according to claim 14, wherein said Fourier transform-based channelizer unit is configured to process successive sets of odd and even numbered filtered data sample outputs of said polyphase filter.

16. A transceiver apparatus according to claim 15, wherein said Fourier transform-based channelizer unit is configured to multiply filtered data sample outputs of said polyphase filter by a complex exponential signal, the resultant product value being coupled to said N-point fast Fourier transform-based processor.

17. A transceiver apparatus according to claim 16, wherein said Fourier transform-based channelizer unit includes a numerically controlled oscillator modulator controlled by filtered data sample outputs of said polyphase filter so as to effectively multiply said filtered data sample outputs by a complex exponential signal.

18. A transceiver apparatus according to claim 13, wherein said Fourier transform-based channelizer unit is configured to process successive sets of odd and even numbered filtered data sample outputs of said polyphase filter.

19. A transceiver apparatus according to claim 18, wherein said Fourier transform-based channelizer unit is configured to multiply filtered data sample outputs of said polyphase filter by a complex exponential signal, the resultant product value being coupled to said N-point fast Fourier transform-based processor.

20. A transceiver apparatus according to claim 19, wherein said Fourier transform-based channelizer unit includes a numerically controlled oscillator modulator controlled by filtered data sample outputs of said polyphase filter so as to effectively multiply said filtered data sample outputs by a complex exponential signal.

21. A transceiver apparatus for a wireless communication network containing multiple frequency communication channels for supporting real time communications among a plurality of geographically distributed first sites, by way of one or more transceiver sites, said transceiver apparatus being installable at a respective one of said one or more transceiver sites and comprising:

a receiver unit which is operative to receive a plurality of signals from a contiguous set of said multiple frequency communication channels and output a digital composite receiver signal representative of the signals received from said plurality of multiple frequency communication channels;

a Fourier transform based channelizer unit which is coupled to receive the digital composite receiver signal from said receiver unit and is operative to output, in real time, respective digital channel signals representative of the contents of respective ones of the signals received from the plurality of communication channels received by said receiver unit;

a first plurality of signal processor units, respectively associated with said digital channel signals output by said Fourier transform based channelizer unit and being operative to process respective ones of said digital channel signals and to supply processed ones of said digital channel signals at respective output ports thereof;

a second plurality of signal processor units, respectively associated with respective ones of a plurality of incoming communication signal, to be transmitted over a respectively different contiguous set of multiple frequency communication channels of said network, and being operative to process respective ones of said plurality of incoming communication signals and to supply processed ones of said incoming communication signals at respective output ports thereof;

a Fourier transform-based combiner unit which is coupled to receive said processed ones of said communication signals processed by said second plurality of digital signal processor units and to output, in real time, a digital combined transmit signal representative of the contents of the incoming communication signals processed by said second plurality of digital signal processor units; and a transmitter unit which is operative to transmit a multiple frequency communication channel signal in accordance with the digital combined transmit signal output by said Fourier transform-based combiner unit; and wherein said Fourier transform-based channelizer unit includes an overlap and add filter to which the composite output by said receiver unit are coupled, and an N-point fast Fourier transform-based processor coupled to the output of said overlap and add filter; and wherein said Fourier transform-based channelizer unit is configured to process successive sets of odd and even numbered filtered data sample outputs of said overlap and add filter.

22. A transceiver apparatus according to claim 21, wherein said Fourier transform-based channelizer unit is configured to multiply filtered data sample outputs of said overlap and add filter by a complex exponential signal, the resultant product value being coupled to said N-point fast Fourier transform-based processor.

23. A transceiver apparatus according to claim 22, wherein said Fourier transform-based channelizer unit includes a numerically controlled oscillator modulator controlled by filtered data sample outputs of said overlap and add filter so as to effectively multiply said filtered data sample outputs by a complex exponential signal.

24. A transceiver apparatus for a wireless communication network containing multiple frequency communication channels for supporting real time communications among a plurality of geographically distributed first sites, by way of one or more transceiver sites said transceiver apparatus being installable at a respective one of said one or more transceiver sites and comprising:

a receiver unit which is operative to receive a plurality of signals from a contiguous set of said multiple frequency communication channels and output a digital composite receiver signal representative of the signals received from said plurality of multiple frequency communication channels;

a Fourier transform based channelizer unit which is coupled to receive the digital composite receiver signal from said receiver unit and is operative to output, in real time, respective digital channel signals representative of the contents of respective ones of the signals received from the plurality communication channels received by said receiver unit;

a first plurality of signal processor units, respectively associated with said digital channel signals output by said Fourier transform based channelizer unit and being operative to process respective ones of said digital channel signals and to supply processed ones of said digital channel signals at respective output ports thereof;

a second plurality of signal processor units, respectively associated with respective ones of a plurality of incoming communication signals to be transmitted over a respectively different contiguous set of multiple frequency communication channels of said network, and being operative to process respective ones of said plurality of incoming communication signals and to supply processed ones of said incoming communication signals at respective output ports thereof;

a Fourier transform-based combiner unit which is coupled to receive said processed ones of said communication signals processed by said second plurality of digital signal processor units and to output, in real time, a digital combined transmit signal representative of the contents of the incoming communication signals processed by said second plurality of digital signal processor units; and a transmitter unit which is operative to transmit a multiple frequency communication channel signal in accordance with the digital combined transmit signal output by said Fourier transform-based combiner unit; and wherein said Fourier transform-based combiner unit includes an N-point fast Fourier transform processor coupled to receive communication channel signals processed by said second plurality of digital signal processor units and an overlap and add filter to which the output of said N-point fast Fourier transform processor are coupled; and wherein said Fourier transform-based combiner unit is configured to multiply data values output by said N-point fast Fourier transform processor by a complex exponential signal, the resultant product value being coupled to each filter tap stage of said overlap and add filter.

25. A transceiver apparatus according to claim 24, wherein said Fourier transform-based combiner unit includes a numerically controlled oscillator modulator controlled by said N-point fast Fourier transform processor so as to effectively multiply the output of said transform processor by a complex exponential signal.

26. A transceiver apparatus according to claim 24, wherein said Fourier transform-based combiner comprises a plurality of block floating point fast Fourier transform engines, the outputs of which are shifted to align the outputs of the engines to a common scale.

27. A transceiver apparatus for a wireless communication network containing multiple frequency communication channels for supporting real time communications among a plurality of geographically distributed first sites, by way of one or more transceiver sites, said transceiver apparatus being installable at a respective one of said one or more transceiver sites and comprising:

a receiver unit which is operative to receive a plurality of signals from a contiguous set of said multiple frequency communication channels and output a digital composite receiver signal representative of the signals received from said plurality of multiple frequency communication channels:

a Fourier transform based channelizer unit which is coupled to receive the digital composite receiver signal from said receiver unit and is operative to output, in real time, respective digital channel signals representative of the contents of respective ones of the signals received from the plurality of communication channels received by said receiver unit:

a first plurality of signal processor units, respectively associated with said digital channel signals output by said Fourier transform based channelizer unit and being operative to process respective ones of said digital channel signals and to supply processed ones of said digital channel signals at respective output ports thereof;

a second plurality of signal processor units, respectively associated with respective ones of a plurality of incoming communication signals to be transmitted over a respectively different contiguous set of multiple frequency communication channels of said network, and being operative to process respective ones of said plurality of incoming communication signals and to supply processed ones of said incoming communication signals at respective output ports thereof;

a Fourier transform-based combiner unit which is coupled to receive said processed ones of said communication signals processed by said second plurality of digital signal processor units and to output, in real time, a digital combined transmit signal representative of the contents of the incoming communication signals processed by said second plurality of digital signal processor units;

a transmitter unit which is operative to transmit a multiple frequency communication channel signal in accordance with the digital combined transmit signal output by said Fourier transform-based combiner unit; and wherein said Fourier transform-based channelizer unit includes an overlap and add filter to which the composite output by said receiver unit are coupled, and an N-point fast Fourier transform-based processor coupled to the output of said overlap and add filter; and wherein said overlap and add filter contains a plurality of cascaded filter tap stages, each of plural ones of which comprises a plurality of delay memories switchably coupled in series with one another, so as to selectively enable the delay memories of successive filter tap stages to be coupled in series.

28. A transceiver apparatus according to claim 27, wherein said overlap and add filter has a decimation rate M, and wherein said plurality of delay memories comprises a first delay memory having a length of M data samples and a second delay memory having a length of N-M data samples.

29. A transceiver apparatus according to claim 28, wherein said Fourier transform-based channelizer unit is configured to process successive sets of odd and even numbered filtered data sample outputs of said overlap and add filter.

30. A transceiver apparatus according to claim 29, wherein said Fourier transform-based channelizer unit is configured to multiply filtered data sample output of said overlap and add filter by a complex exponential signal, the resultant product value being coupled to said N-point fast Fourier transform-based processor.

31. A transceiver apparatus according to claim 30, wherein said Fourier transform-based channelizer unit includes a numerically controlled oscillator modulator controlled by filtered data sample outputs of said overlap and add filter so as to effectively multiply said filtered data sample outputs by a complex exponential signal.

32. A transceiver apparatus according to claim 28, wherein said each filter tap stage includes a controllable switch, coupled in a signal flow path between plural delay memories of said stage, and being operative to either selectively enable the plural delay memories of said stage to be connected in series with one another, and thereby in a cascaded signal flow path with other tap stages of said filter, or to feed back the contents of one of said plural delay memories to itself.

33. A transceiver apparatus according to claim 32, wherein said each filter tap stage further includes a coefficient memory which stores a plurality of N weighting coefficients, and a multiplier which is operative to multiply respective weighting coefficients stored in said coefficient memory by data sample values from a signal flow path through said delay memories.

34. A transceiver apparatus according to claim 33, wherein said overlap and add filter further includes a summation stage for summing together products output by respective multipliers of said filter tap stages, the output of said summation stage being coupled to said N-point fast-Fourier transform processor.

35. A transceiver apparatus for a wireless communication network containing multiple frequency communication channels for supporting real time communications among a plurality of geographically distributed first sites, by way of one or more transceiver sites, said transceiver apparatus being installable at a respective one of said one or more transceiver sites and comprising:

a receiver unit which is operative to receive a plurality of signals from a contiguous set of said multiple frequency communication chapels and output a digital composite receiver signal representative of the signals received from said plurality of multiple frequency communication channels;

a Fourier transform based channelizer unit which is coupled to receive the digital composite receiver signal from said receiver unit and is operative to output, in real time, respective digital channel signals representative of the contents of respective ones of the signals received from the plurality of communication channels received by said receiver unit;

a first plurality of signal processor units, respectively associated with said digital channel signals output by said Fourier transform based channelizer unit and being operative to process respective ones of said digital channel signals and to supply processed ones of said digital channel signals at respective output ports thereof;

a second plurality of signal processor units, respectively associated with respective ones of a plurality of incoming communication signals to be transmitted over a respectively different contiguous set of multiple frequency communication channels of said network, and being operative to process respective ones of said plurality of incoming communication signals and to supply processed ones of said incoming communication signals at respective output ports thereof;

a Fourier transform-based combiner unit which is coupled to receive said processed ones of said communication signals processed by said second plurality of digital signal processor units and to output, in real time, a digital combined transmit signal representative of the contents of the incoming communication signals processed by said second plurality of digital signal processor units; and a transmitter unit which is operative to transmit a multiple frequency communication channel signal in accordance with the digital combined transmit signal output by said Fourier transform-based combiner unit; and wherein said Fourier transform-based combiner unit includes an N-point fast Fourier transform processor coupled to receive communication channel signals processed by said second plurality of digital signal processor units, and an overlap and add filter to which the output of said N-point fast Fourier transform processor are coupled; and wherein said overlap and add filter contains a plurality J of cascaded filter tap stages, each of plural ones of which comprises a plurality of delay memories switchably coupled in series with one another, so as to selectively enable the delay memories of successive filter tap stages to be coupled in series.

36. A transceiver apparatus according to claim 35, wherein said overlap and add filter has a decimation rate M, and wherein said plurality of delay memories comprises a first delay memory having a length of M data samples and a second delay memory having a length of N-M data samples.

37. A transceiver apparatus according to claim 36, wherein said each filter tap stage includes a coefficient memory which stores a plurality of N weighting coefficients, a multiplier which is operative to multiply respective weighting coefficients stored in said coefficient memory by Fourier processed data samples, and an adder to which the output of said multiplier and one of said plurality of delay memories is coupled, said adder having an output coupled to a second of said plurality of delay memories of a successive filter tap stage.

38. A transceiver apparatus according to claim 37, wherein said each filter tap stage includes a controllable switch, coupled in a signal flow path between plural delay memories of said stage, and being operative to either selectively enable the plural delay memories of said stage to be connected in series with one another, and thereby in a cascaded signal flow path with other tap stages of said filter, or to feed back the contents of one of said plural delay memories to itself.

39. A transceiver apparatus according to claim 38, wherein said overlap and add filter has a first tap stage containing a coefficient memory which stores a plurality of N weighting coefficients, a multiplier which is operative to multiply respective weighting coefficients stored in said coefficient memory by Fourier processed data samples, a controllable switch having a first input port coupled to receive a sequence of prescribed data values, a second input port coupled to the output of said adder, and an output port coupled to an N-M sample delay memory, said N-M sample delay memory having an output coupled to said adder to be summed with the output of said multiplier, and wherein the output of the multiplier of said first filter tap stage is coupled to a successive filter tap stage of said overlap and add filter, and wherein said controllable switch is operative to either couple said sequence of prescribed data values to said N-M sample memory or to feed back the contents of said delay memory to itself.

40. A transceiver apparatus according to claim 39, wherein the Jth one of said plurality J of filter tap stages has its adder output coupled to provide a combined signal representative of the contents of the communication channel signals processed by said second plurality of digital signal processor units.

41. A transceiver apparatus according to claim 40, wherein said Fourier transform-based combiner unit is configured to process successive sets of odd and even numbered filtered data samples supplied by said second plurality of digital signal processor units.

42. An overlap and add filter architecture comprising:

(a) a plurality of cascaded filter tap stages, each cascaded filter tap stage comprising:

(b) a plurality of delay memories switchably coupled in series with one another, so as to selectively enable the delay memories of successive filter tap stages to be controllably coupled in series each filter tap stage including:

(c) a coefficient memory which stores a plurality of N weighting coefficients;

(d) a multiplier, which is operative to multiply respective weighting coefficients stored in said coefficient memory by data samples to be filtered;

(e) and an adder, to which the output of said multiplier and one of said plurality of delay memories is coupled, said adder having an output coupled to a second of said plurality of delay memories of a successive filter tap stage.

43. An overlap and add filter architecture according to claim 42, wherein said each filter tap stage includes a controllable switch, coupled in a signal flow path between plural delay memories of said stage, and being operative to either selectively enable the plural delay memories of said stage to be connected in series with one another, and thereby in a cascaded signal flow path with other tap stages of said filter, or to feed back the contents of one of said plural delay memories to itself.

44. An overlap and add filter architecture according to claim 43, wherein said overlap and add filter has a first tap stage containing a coefficient memory which stores a plurality of N weighting coefficients, a multiplier which is operative to multiply respective weighting coefficients stored in said coefficient memory by data samples to be filtered, a controllable switch having a first input port coupled to receive a sequence of prescribed data values, a second input port coupled to the output of said adder, and an output port coupled to a delay memory, said delay memory having an output coupled to said adder to be summed with the output of said multiplier, and wherein the output of the multiplier of said first filter tap stage is coupled to a successive filter tap stage of said overlap and add filter, and wherein said controllable switch is operative to either couple said sequence of prescribed data values to said N-M sample memory or to feed back the contents of said delay memory to itself.

45. An overlap and add filter according to claim 43, wherein the output of said filter is derived from the output of the adder of the Jth one of said plurality J of filter tap stages.

46. For use with a wireless communication network having multiple frequency communication channels for supporting real time communications among a plurality of geographically distributed first sites by way of one or more transceiver sites, a method of transmitting and receiving wideband communication signals at a respective one of said one or more transceiver sites and comprising the steps of:

(a) receiving signals from a contiguous plurality of said multiple frequency communication channels and generating a plurality of digital signals representative of the contents of said plurality of multiple frequency communication channels;

(b) Fourier transform-processing said plurality of digital signals generated in step (a) and producing therefrom respective digital channel signals representative of the contents of respective ones of the signals received from the communication channels in step (a), in real time;

(c) processing respective ones of said digital channel signals;

(d) processing respective ones of a plurality of incoming digital communication signals to be transmitted over respectively different contiguous frequency channels of said network;

(e) Fourier transform-processing digital communication signals processed in step (d) and producing therefrom a combined signal representative of the contents of the digital communication channel signals processed in step (d), in real time; and (f) transmitting a multiple frequency communication channel signal in accordance with the combined signal produced in step (e).

47. A method according to claim 46, wherein in steps (b) and (e) the Fourier transform processing is executed with a plurality of block floating point fast Fourier transform engines, the outputs of which are shifted to align the outputs of the engines to a common scale.

48. A method as in claim 46 wherein said processed ones of said incoming digital communication signals output by said step (d) are connected to said Fourier transform-processing step (d) via a time division multiplex (TDM) bus.

49. A method according to claim 46, wherein step (e) comprises applying said digital communication channel signals to an N-point fast Fourier transform processor and filtering the output of said N-point fast Fourier transform processor by a polyphase filter.

50. A method according to claim 46, wherein a sampling rate of the digital channel signals output by said Fourier transform-processing step (b) is independent of a size of said Fourier transform processing step (b).

51. A method according to claim 46 wherein a sampling rate of the digital signals produced in step (a) are not an exact multiple of a sampling rate of the individual digital channel signals produced in step (b).

52. A method according to claim 46 wherein a sampling rate of said wideband communications signals in step (a) is independent of a size of the Fourier transform processing in step (b).

53. A method according to claim 46 wherein a sampling rate of the combined signal output in step (e) is not an exact multiple of a sampling rate of the incoming digital communication signals in step (d).

54. A method according to claim 46, wherein step (b) comprises filtering said plurality of digital signals generated in step (a) by means of a polyphase filter and processing the resultant filtered signals by an N-point fast Fourier transform-based processor.

55. A method according to claim 54, wherein said polyphase filter comprises a finite impulse response filter containing a plurality of filter tap stages, each of which comprises a delay memory, so that the delay memories of successive filter tap stages are coupled in series, each filter tap stage further including a coefficient memory which stores a plurality of N weighting coefficients, and the step (b) further comprises:

(xvi) multiplying respective weighting coefficients stored in said coefficient memory by data sample values from a signal flow path through said delay memories, (xvii) summing together products output by respective multipliers of said filter tap stages; and (xviii) coupling the output of said summation stage to said N-point fast-Fourier transform processor.

56. A method according to claim 55, wherein step (b) further comprises Fourier transform-processing successive sets of odd and even numbered filtered data sample outputs of said polyphase filter.

57. A method according to claim 56, wherein step (b) further comprises the step of;

(xix) multiplying filtered data sample outputs of said polyphase filter by a complex exponential signal; and (xx) coupling the resultant product value to said N-point fast Fourier transform-based processor.

58. A method as in claim 46 wherein the digital channel signals output by the are Fourier transform-processing step (b) connected to said processing step (c) via a time division multiplex (TDM) bus.

59. A method as in claim 58 wherein said processed ones of said incoming digital communication signals output by said step (d) are connected to said Fourier transform-processing step (d) via a time division multiplex (TDM) bus.

60. A method according to claim 46, wherein step (b) further comprises (i) filtering said plurality of digital signals generated in step (a) by means of an overlap and add filter and processing the resultant filtered signals by an N-point fast Fourier transform-based processor.

61. A method according to claim 60, wherein said overlap and add filter contains a plurality of cascaded filter tap stages, each of plural ones of which comprises a plurality of delay memories switchably coupled in series with one another, and the step (b) further comprises the step of (ii) selectively enabling the delay memories of successive filter tap stages to be coupled in series.

62. A method according to claim 61, wherein said overlap and add filter has a decimation rate M, and wherein the step (b) further comprises the step of (iii) selectively enabling said plurality of delay memories with a first delay memory having a length of M data samples and a second delay memory having a length of N-M data samples.

63. A method according to claim 62, wherein the step (b) further comprises the step of:

(iv) Fourier transform-processing successive sets of odd and even numbered filtered data sample outputs of said overlap and add filter.

64. A method according to claim 63, wherein the step (b) further comprises the step of (v) multiplying filtered data sample outputs of said overlap and add filter by a complex exponential signal.

65. A method according to claim 46, wherein step (e) comprises (vi) applying communication channel signals processed in step (d) to an N-point fast Fourier transform processor, and (vii) filtering the output of said N-point fast Fourier transform processor by an overlap and add filter.

66. A method according to claim 65, wherein said overlap and add filter contains a plurality of cascaded filter tap stages, each of plural ones of which comprises a plurality of delay memories switchably coupled in series with one another, and the step (vii) further comprises:

(viii) selectively enabling the delay memories of successive filter tap stages to be coupled in series.

67. A method according to claim 66, wherein said overlap and add filter has a decimation rate M, and wherein the step (viii) further comprises:

selectively enabling the said plurality of delay memories to provide a first delay having a length of M data samples and a second delay having a length of N-M data samples.

68. A method according to claim 67, wherein step (e) further includes the step of (ix) multiplying Fourier transform-processed digital communication signals by a complex exponential signal, and (x) applying the resultant product signal to said overlap and add filter.

69. A method according to claim 66, wherein said each filter tap stage includes a coefficient memory which stores a plurality of weighting coefficients, and step (b) further comprises:

(xi) multiplying respective weighting coefficients stored in said coefficient memory by Fourier processed data samples (xii) adding the output of said multiplying step (xi) and the output one of said plurality of delay memories, said addition step output being coupled to a second of said plurality of delay memories of a successive filter tap stage.

70. A method according to claim 69, wherein said each filter tap stage includes a controllable switch, coupled in a signal flow path between plural delay memories of said stage, and step (b) further comprises:

selectively enabling the plural delay memories of said stage to be connected in series with one another, and thereby in a cascaded signal flow path with other tap stages of said filter, or to feed back the contents of one of said plural delay memories to itself.

71. A method according to claim 70, wherein said overlap and add filter has a first tap stage containing a coefficient memory which stores a plurality of N weighting coefficients, and step (b) further comprises:

(xiii) multiplying respective weighting coefficients stored in said coefficient memory by Fourier processed data samples; and (xiv) controllably switching a first input port coupled to receive a sequence of prescribed data values, and a second input port coupled to the output of said addition step (xii), and an output port coupled to an N-M sample delay memory, said N-M sample delay memory having an output coupled to said adder to be summed with the output of said multiplying step (xiii), (xv) coupling the output of the multiplier of said first filter tap stage to a successive filter tap stage of said overlap and add filter, and (xvi) operating said controllable switching step to either couple said sequence of prescribed data values to said N-M sample memory or to feed back the contents of said delay memory to itself.

72. A method according to claim 71, additionally comprising the step of coupling an adder on output of the Jth one of said plurality i of filter tap stages to provide a combined signal to be transmitted in step (f).

* * * * *